(12) United States Patent
Xu et al.

(10) Patent No.: US 12,683,250 B2
(45) Date of Patent: Jul. 14, 2026

(54) ELECTRODE ASSEMBLY, BATTERY CELL, BATTERY AND ELECTRICAL APPARATUS

(71) Applicant: CONTEMPORARY AMPEREX TECHNOLOGY CO., LIMITED, Ningde (CN)

(72) Inventors: Hu Xu, Ningde (CN); Siying Huang, Ningde (CN); Jipeng Guo, Ningde (CN); Shaojun Niu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/324,078

(22) Filed: Sep. 9, 2025

(65) Prior Publication Data

US 2026/0011878 A1　　Jan. 8, 2026

Related U.S. Application Data

(63) Continuation of application No. PCT/CN2023/142946, filed on Dec. 28, 2023.

(30) Foreign Application Priority Data

Sep. 14, 2023　(CN) .......................... 202311186322.5

(51) Int. Cl.
H01M 50/533 (2021.01)
H01M 50/107 (2021.01)
(Continued)

(52) U.S. Cl.
CPC ....... H01M 50/533 (2021.01); H01M 50/107 (2021.01); H01M 50/538 (2021.01); H01M 50/593 (2021.01); H01M 2220/20 (2013.01)

(58) Field of Classification Search
CPC ............. H01M 50/533; H01M 50/107; H01M 50/538; H01M 50/593; H01M 2220/20
(Continued)

(56) References Cited

U.S. PATENT DOCUMENTS

| | | | |
|---|---|---|---|
| 2020/0144676 A1 | 5/2020 | Tsuruta et al. | |
| 2023/0095885 A1* | 3/2023 | Lee ..................... | H01M 50/271 |
| | | | 429/121 |
| 2023/0253568 A1* | 8/2023 | Jung ................. | H01M 50/3425 |
| | | | 429/53 |

FOREIGN PATENT DOCUMENTS

| | | |
|---|---|---|
| CN | 110957466 A | 4/2020 |
| CN | 115051084 A | 9/2022 |

(Continued)

OTHER PUBLICATIONS

International Search Report in the international application No. PCT/CN2023/142946, dated Apr. 23, 2024, 6 pages with English translation.

(Continued)

*Primary Examiner* — Allison Bourke
*Assistant Examiner* — Robert Gene West
(74) *Attorney, Agent, or Firm* — K&L Gates LLP

(57) ABSTRACT

The present application provides an electrode assembly, a battery cell, a battery and an electrical apparatus. The electrode assembly includes a main body part, a first tab and a second tab. The main body part is cylindrical. The polarities of the first tab and the second tab are opposite, the first tab and the second tab are arranged at the same end of the main body part along an axial direction of the main body part, and the electrical conductivity of the first tab is smaller than the electrical conductivity of the second tab. Along the axial direction of the main body part, the first tab has a first surface away from the main body part, and the second tab (Continued)

has a second surface away from the main body part, the area of the first surface being larger than the area of the second surface.

18 Claims, 9 Drawing Sheets

(51) Int. Cl.
H01M 50/538 (2021.01)
H01M 50/593 (2021.01)

(58) Field of Classification Search
USPC ......................................................... 429/163
See application file for complete search history.

(56) References Cited

FOREIGN PATENT DOCUMENTS

| | | | |
|---|---|---|---|
| CN | 115663358 | A | 1/2023 |
| CN | 218887468 | U | 4/2023 |
| CN | 218939957 | U | 4/2023 |
| CN | 219086100 | U | 5/2023 |
| CN | 219303811 | U | 7/2023 |
| CN | 219303812 | U | 7/2023 |
| CN | 116683011 | A | 9/2023 |
| CN | 116936953 | A | 10/2023 |
| DE | 202023102577 | U1 * | 6/2023 .......... H01M 50/107 |
| JP | 2011138633 | A | 7/2011 |
| WO | 2023004823 | A1 | 2/2023 |
| WO | 2023092450 | A1 | 6/2023 |
| WO | 2023092757 | A1 | 6/2023 |
| WO | 2023134480 | A1 | 7/2023 |

OTHER PUBLICATIONS

ISA Written Opinion in the international application No. PCT/CN2023/142946, dated Apr. 23, 2024, 8 pages with English translation.

The First Office Action in the CN application No. 202311186322.5, dated Oct. 31, 2023, 20 pages with English translation.

The Grant Notice in the CN application No. 202311186322.5, dated Nov. 24, 2023, 6 pages with English translation.

* cited by examiner

ELECTRODE ASSEMBLY, BATTERY CELL, BATTERY AND ELECTRICAL APPARATUS

CROSS-REFERENCE TO RELATED APPLICATIONS

The present application is a continuation of International Application No. PCT/CN2023/142946, filed Dec. 28, 2023, which claims the priority of Chinese Patent Application No. 2023111863225 filed on Sep. 14, 2023 and entitled "ELECTRODE ASSEMBLY, BATTERY CELL, BATTERY AND ELECTRICAL APPARATUS", which is incorporated herein by reference in its entirety.

TECHNICAL FIELD

The present application relates to the technical field of batteries, and in particular, to an electrode assembly, a battery cell, a battery and an electrical apparatus.

BACKGROUND

In recent years, new energy vehicles have made a leap forward in development. In the field of electric vehicles, power batteries, as power sources of electric vehicles, play an irreplaceable and important role. With the vigorous promotion of new energy vehicles, the demand for power battery products is also growing. Batteries, as core components of new energy vehicles, have relatively high requirements in terms of use reliability. A battery cell usually includes a shell and an electrode assembly accommodated in the shell. However, it is difficult to assemble the existing electrode assembly into the shell, which is not conducive to improving the assembly efficiency of the electrode assembly.

SUMMARY OF THE INVENTION

Embodiments of the present application provide an electrode assembly, a battery cell, a battery and an electrical apparatus, which can effectively improve the assembly efficiency of the electrode assembly.

According to a first aspect, an embodiment of the present application provides an electrode assembly, including a main body part, a first tab and a second tab; the main body part is cylindrical; and the polarities of the first tab and the second tab are opposite, the first tab and the second tab are arranged at the same end of the main body part along the axial direction of the main body part, the electrical conductivity of the first tab is $X_1$, and the electrical conductivity of the second tab is $X_2$, satisfying $X_2>X_1$, where along the axial direction of the main body part, the first tab has a first surface away from the main body part, and the second tab has a second surface away from the main body part, the area of the first surface being larger than the area of the second surface.

In the above technical solution, by arranging the first tab and the second tab of the electrode assembly at the same end of the main body part in the axial direction of the main body part, it is conducive to saving the space occupied by the electrode assembly in the axial direction of the main body part, so as to improve the energy density of a battery cell having such an electrode assembly. By setting the area of the first surface of the first tab away from the main body part in the axial direction of the main body part to be larger than the area of the second surface of the second tab away from the main body part in the axial direction of the main body part, the areas of regions of the first tab and the second tab configured to be connected to the corresponding output poles are different, so that during the assembly of a battery cell, it is convenient to distinguish and identify the first tab and the second tab with different polarities, and the first tab and the second tab can be assembled with the corresponding output poles respectively without secondary positioning of the electrode assembly, thereby being conducive to reducing the difficulty in the subsequent assembly of the electrode assembly to improve the assembly efficiency of the electrode assembly. In addition, by setting the electrical conductivity of the first tab to be smaller than the electrical conductivity of the second tab, the conductivity of the first tab is weaker than the conductivity of the second tab. Thus, by setting the area of the first surface of the first tab to be larger than the area of the second surface of the second tab, the area of the first surface of the first tab with smaller electrical conductivity connected to the output pole is larger, while the area of the second surface of the second tab with larger electrical conductivity connected to the output pole is smaller, which is conducive to achieving the close flow capacity of the first tab and the second tab and reasonably designing the sizes of the first tab and the second tab, thereby effectively alleviating the phenomenon of excess flow area in the first tab or the second tab, so as to reasonably optimize the space and weight occupied by the first tab or the second tab, which is conducive to improving the energy density of the battery cell.

In some embodiments, the area of the first surface is $S_1$, and the area of the second surface is $S_2$, satisfying $S_1/S_2 \geq X_2/X_1$.

In the above technical solution, by setting the ratio of the area of the first surface of the first tab to the area of the second surface of the second tab to be larger than or equal to the inverse ratio of the electrical conductivity of the first tab to the electrical conductivity of the second tab, the area of the first surface of the first tab with smaller electrical conductivity connected to the output pole is larger, which is conducive to further achieving the close flow capacity of the first tab and the second tab, so as to reduce the phenomenon of excess flow area of the first tab or the second tab.

In some embodiments, the first surface is in a sector ring or sector shape.

In the above technical solution, by setting the first surface of the first tab to be of a structure in the sector ring or sector shape, the space utilization rate of the first tab at one end of the main body part can be increased, and the area of contact between the first tab and the output pole through the first surface can be increased.

In some embodiments, along the circumferential direction of the main body part, two ends of the first tab respectively form a first end face and a second end face, the first end face is connected to the first surface to form a first edge, the second end face is connected to the first surface to form a second edge, and the angle between the first edge and the second edge is $\alpha$, satisfying $45° \leq \alpha \leq 270°$.

In the above technical solution, by setting the angle formed between the first edge and the second edge of the first tab to be larger than or equal to 45 degrees, the central angle of the first surface of the first tab in the sector ring or sector shape is larger than or equal to 45 degrees, so that the first surface of the first tab has a sufficient area to contact with the output pole, thereby increasing the flow area between the first tab and the output pole. In addition, by setting the angle formed between the first edge and the second edge of the first tab to be smaller than or equal to 270 degrees, the central angle of the first surface of the first tab in the sector ring or sector shape is smaller than or equal to 270 degrees, so as to alleviate the phenomenon that the first tab and the second tab are easily short-circuited due to too large space occupied by the first tab, thereby improving the use reliability of the electrode assembly.

In some embodiments, the angle between the first edge and the second edge is $\alpha$, satisfying $90° \leq \alpha \leq 180°$.

In the above technical solution, by setting the angle formed between the first edge and the second edge of the first tab to be larger than or equal to 90 degrees, the central angle of the first surface of the first tab in the sector ring or sector shape is larger than or equal to 90 degrees, so that the first surface of the first tab has a sufficient area to contact with the output pole, thereby being conducive to increasing the flow area between the first tab and the output pole. In addition, by setting the angle formed between the first edge and the second edge of the first tab to be smaller than or equal to 180 degrees, the central angle of the first surface of the first tab in the sector ring or sector shape is smaller than or equal to 180 degrees, which is conducive to alleviating the phenomenon of mutual interference between the first tab and the second tab due to too much space occupied by the first tab, thereby reducing the risk of short circuit between the first tab and the second tab.

In some embodiments, the first end face and the second end face are both parallel to the axial direction of the main body part.

In the above technical solution, by setting the first end face and the second end face of the first tab to be parallel to the axial direction of the main body part, the first tab as a whole is of a structure in the sector ring or sector shape, thereby reducing the processing difficulty of the first tab, and facilitating the assembly and connection between the first tab and the output pole.

In some embodiments, the plane where the first end face is located intersects with the plane where the second end face is located at the central axis of the main body part.

In the above technical solution, by enabling the plane where the first end face is located to intersect with the plane where the second end face is located at the central axis of the main body part, the straight line where the plane where the first end face is located intersects with the plane where the second end face is located is collinear with the central axis of the main body part, so that the first surface is of a structure in the sector ring or sector shape with the center of a circle on the central axis of the main body part. Therefore, on the one hand, it is easy to process the first tab and conducive to reducing the processing difficulty of the first tab; and on the other hand, the space utilization rate of the first tab at one end of the main body part can be further increased.

In some embodiments, along the circumferential direction of the main body part, two ends of the first tab respectively form a first end face and a second end face, the first end face and the second end face are arranged opposite to each other, the first end face is connected to the first surface to form a first edge, the second end face is connected to the first surface to form a second edge, and the first edge is parallel to the second edge.

In the above technical solution, the first end face and the second end face at two ends of the first tab are arranged opposite to each other in the circumferential direction of the main body part, and the first edge formed by the first end face connected to the first surface and the second edge formed by the second end face connected to the first surface are parallel to each other, so that the two ends of the first tab in the circumferential direction of the main body part are flush with each other. Therefore, the first surface of the first tab has a constant width in the radial direction of the main body part, thereby being easier to implement the processing technology of the first tab, and conducive to reducing the processing difficulty of the first tab.

In some embodiments, the first end face and the second end face are both parallel to the axial direction of the main body part.

In the above technical solution, by setting the first end face and the second end face of the first tab to be parallel to the axial direction of the main body part, the first tab as a whole has a constant width in the radial direction of the main body part, thereby reducing the processing difficulty of the first tab.

In some embodiments, the second surface is in a sector ring or sector shape.

In the above technical solution, by setting the second surface of the second tab to be of a structure in the sector ring or sector shape, the space utilization rate of the second tab at one end of the main body part can be increased, and the area of contact between the second tab and the output pole through the second surface can be increased.

In some embodiments, along the circumferential direction of the main body part, two ends of the second tab respectively form a third end face and a fourth end face, the third end face is connected to the second surface to form a third edge, the fourth end face is connected to the second surface to form a fourth edge, and the angle between the third edge and the fourth edge is $\beta$, satisfying $45° \leq \beta \leq 270°$.

In the above technical solution, by setting the angle formed between the third edge and the fourth edge of the second tab to be larger than or equal to 45 degrees, the central angle of the second surface of the second tab in the sector ring or sector shape is larger than or equal to 45 degrees, so that the second surface of the second tab has a sufficient area to contact with the output pole, thereby increasing the flow area between the second tab and the output pole. In addition, by setting the angle formed between the third edge and the fourth edge of the second tab to be smaller than or equal to 270 degrees, the central angle of the second surface of the second tab in the sector ring or sector shape is smaller than or equal to 270 degrees, so as to alleviate the phenomenon that the second tab and the first tab are easily short-circuited due to too large space occupied by the second tab, thereby improving the use reliability of the electrode assembly.

In some embodiments, the angle between the third edge and the fourth edge is $\beta$, satisfying $90° \leq \beta \leq 120°$.

In the above technical solution, by setting the angle formed between the third edge and the fourth edge of the second tab to be larger than or equal to 90 degrees, the central angle of the second surface of the second tab in the sector ring or sector shape is larger than or equal to 90 degrees, so that the second surface of the second tab has a sufficient area to contact with the output pole, thereby being conducive to increasing the flow area between the second tab and the output pole. In addition, by setting the angle formed between the third edge and the fourth edge of the second tab to be smaller than or equal to 120 degrees, the central angle of the second surface of the second tab in the sector ring or sector shape is smaller than or equal to 120 degrees, which is conducive to alleviating the phenomenon of mutual interference between the second tab and the first tab due to too much space occupied by the second tab, thereby reducing the risk of short circuit between the second tab and the first tab.

In some embodiments, the third end face and the fourth end face are both parallel to the axial direction of the main body part.

In the above technical solution, by setting the third end face and the fourth end face of the second tab to be parallel to the axial direction of the main body part, the second tab as a whole is of a structure in the sector ring or sector shape, thereby reducing the processing difficulty of the second tab, and facilitating the assembly and connection between the second tab and the output pole.

In some embodiments, the plane where the third end face is located intersects with the plane where the fourth end face is located at the central axis of the main body part.

In the above technical solution, by enabling the plane where the third end face is located to intersect with the plane where the fourth end face is located at the central axis of the main body part, the straight line where the plane where the third end face is located intersects with the plane where the fourth end face is located is collinear with the central axis of the main body part, so that the second surface is of a structure in the sector ring or sector shape with the center of a circle on the central axis of the main body part. Therefore, on the one hand, it is easy to process the second tab and conducive to reducing the processing difficulty of the second tab; and on the other hand, the space utilization rate of the second tab at one end of the main body part can be further increased.

In some embodiments, along the circumferential direction of the main body part, two ends of the second tab respectively form a third end face and a fourth end face, the third end face and the fourth end face are arranged opposite to each other, the third end face is connected to the second surface to form a third edge, the fourth end face is connected to the second surface to form a fourth edge, and the third edge is parallel to the fourth edge.

In the above technical solution, the third end face and the fourth end face at two ends of the second tab are arranged opposite to each other in the circumferential direction of the main body part, and the third edge formed by the third end face connected to the second surface and the fourth edge formed by the fourth end face connected to the second surface are parallel to each other, so that the two ends of the second tab in the circumferential direction of the main body part are flush with each other. Therefore, the second surface of the second tab has a constant width in the radial direction of the main body part, thereby being easier to implement the processing technology of the second tab, and conducive to reducing the processing difficulty of the second tab.

In some embodiments, the third end face and the fourth end face are both parallel to the axial direction of the main body part.

In the above technical solution, by setting the third end face and the fourth end face of the second tab to be parallel to the axial direction of the main body part, the second tab as a whole has a constant width in the radial direction of the main body part, thereby reducing the processing difficulty of the second tab.

In some embodiments, along the radial direction of the main body part, the first tab and the outer peripheral surface of the main body part are arranged at an interval; and/or, along the radial direction of the main body part, the second tab and the outer peripheral surface of the main body part are arranged at an interval.

In the above technical solution, by arranging the first tab and the outer peripheral surface of the main body part at an interval in the radial direction of the main body part, the risk of short circuit between the first tab and the shell can be reduced when the electrode assembly is assembled into the shell of the battery cell, thereby being conducive to improving the use reliability of the battery cell having such an electrode assembly. Similarly, by arranging the second tab and the outer peripheral surface of the main body part at an interval in the radial direction of the main body part, the risk of short circuit between the second tab and the shell can be reduced when the electrode assembly is assembled into the shell of the battery cell, thereby being conducive to improving the use reliability of the battery cell having such an electrode assembly.

In some embodiments, the electrode assembly is a wound electrode assembly, the main body part has a central through hole, and the central through hole passes through the main body part along the axial direction of the main body part, where along the radial direction of the main body part, the first tab and the hole wall face of the central through hole are arranged at an interval; and/or, along the radial direction of the main body part, the second tab and the hole wall face of the central through hole are arranged at an interval.

In the above technical solution, by arranging the first tab and the hole wall face of the central through hole at an interval in the radial direction of the main body part, the risk of short circuit between the first tab and the second tab can be reduced, thereby being conducive to improving the use reliability of the electrode assembly. Similarly, by arranging the second tab and the hole wall face of the central through hole at an interval in the radial direction of the main body part, the risk of short circuit between the second tab and the first tab can be reduced, thereby being conducive to improving the use reliability of the electrode assembly.

According to a second aspect, an embodiment of the present application further provides a battery cell, including a shell and the above electrode assembly. The electrode assembly is accommodated in the shell.

In the above technical solution, for the battery cell using such a structure, by setting the area of the first surface of the first tab away from the main body part in the axial direction of the main body part to be larger than the area of the second surface of the second tab away from the main body part in the axial direction of the main body part, the areas of regions of the first tab and the second tab configured to be connected to the output poles of the battery cell are different, so that during the assembly of the battery cell, it is convenient to distinguish and identify the first tab and the second tab with different polarities, and the first tab and the second tab can be assembled with the corresponding output poles respectively without secondary positioning of the electrode assembly when the electrode assembly is assembled into the shell, thereby being conducive to reducing the assembly difficulty of the battery cell to improve the assembly efficiency of the battery cell.

In some embodiments, the shell has a wall portion, the battery cell further includes an electrode terminal, and the electrode terminal is mounted on the wall portion in an insulated manner, where along the axial direction of the main body part, the first tab and the second tab are both arranged at one end of the main body part facing the wall portion, the first surface is configured to be electrically connected to the wall portion, and the second surface is configured to be electrically connected to the electrode terminal.

In the above technical solution, the first tab and the second tab are both arranged at one end of the main body part facing the wall portion, the first surface of the first tab is configured to be electrically connected to the wall portion, and the second surface of the second tab is configured to be electrically connected to the electrode terminal, so that the input or output of the electric energy of the first tab and the second tab of the electrode assembly can be achieved, the structure is simple, and the assembly is facilitated.

In some embodiments, the electrode terminal protrudes from a side of the wall portion facing the electrode assembly, where along the axial direction of the main body part, the first surface is closer to the wall portion than the second surface.

In the above technical solution, the electrode terminal is configured to protrude from the side of the wall portion facing the electrode assembly so as to facilitate the electrical connection between the electrode terminal and the second tab, where the first surface of the first tab is configured to be closer to the wall portion than the second surface of the second tab, so that the height of the first tab protruding from the main body part is greater than the height of the second tab protruding from the main body part, and then, the first tab can compensate for the distance difference between the wall portion and the electrode terminal, thereby reducing the difficulty of electrical connection between the first tab and the wall portion, and improving the effect of electrical connection between the first tab and the wall portion.

In some embodiments, the battery cell further includes a first current collecting member and a second current collecting member; the first current collecting member is arranged between the wall portion and the first surface, and the first current collecting member connects the wall portion and the first surface to electrically connect the first tab and the wall portion; and the second current collecting member is arranged between the electrode terminal and the second surface, the second current collecting member and the first current collecting member are arranged at an interval, and the second current collecting member connects the electrode terminal and the second surface to electrically connect the second tab and the electrode terminal.

In the above technical solution, the first current collecting member is arranged between the wall portion and the first surface of the first tab, and the first current collecting member connects the wall portion and the first surface of the first tab to achieve electrical connection between the first tab and the wall portion, thereby being conducive to reducing the difficulty of electrical connection between the first surface of the first tab and the wall portion. Similarly, the second current collecting member is arranged between the electrode terminal and the second surface of the second tab, and the second current collecting member connects the electrode terminal and the second surface of the second tab to achieve electrical connection between the second tab and the electrode terminal, thereby being conducive to reducing the difficulty of electrical connection between the second tab and the electrode terminal. In addition, the first current collecting member and the second current collecting member are arranged at an interval to reduce the phenomenon of short circuit between the first current collecting member and the second current collecting member, thereby being conducive to reducing the use risk of the battery cell.

In some embodiments, the battery cell further includes a first insulating member; and the first insulating member is arranged between the electrode assembly and the wall portion, and the first insulating member isolates the first current collecting member from the second current collecting member in an insulated manner.

In the above technical solution, the first insulating member is arranged between the electrode assembly and the wall portion, and the first insulating member is configured to isolate the first current collecting member from the second current collecting member in an insulated manner, so as to achieve insulated isolation between the first current collecting member and the second current collecting member, thereby being conducive to further reducing the risk of short circuit between the first current collecting member and the second current collecting member.

In some embodiments, the first insulating member is provided with a first mounting hole and a second mounting hole arranged at an interval, the first current collecting member is arranged in the first mounting hole, and the second current collecting member is arranged in the second mounting hole.

In the above technical solution, by providing the first mounting hole and the second mounting hole arranged at an interval on the first insulating member and arranging the first current collecting member and the second current collecting member in the first mounting hole and the second mounting hole respectively, on the one hand, the first current collecting member and the second current collecting member can be assembled to the first insulating member, so that the first insulating member can support and assemble the first current collecting member and the second current collecting member, thereby being conducive to reducing the difficulty of arranging the first current collecting member and the second current collecting member between the wall portion and the electrode assembly; and on the other hand, the first current collecting member and the second current collecting member can be arranged at an interval on the first insulating member to achieve insulated isolation between the first current collecting member and the second current collecting member.

In some embodiments, the first insulating member includes a first insulator and a second insulator; the first insulator is a ring structure; and the second insulator is connected to the first insulator, the second insulator is configured to separate the internal space of the first insulator into the first mounting hole and the second mounting hole, and the second insulator is located between the first current collecting member and the second current collecting member.

In the above technical solution, the first insulating member is provided with the first insulator having the ring structure and the second insulator connected to the inner side of the first insulator, and the second insulator is configured to separate the internal space of the first insulator into the first mounting hole and the second mounting hole, so that the first insulator and the second insulator together define the first mounting hole and the second mounting hole for assembling the first current collecting member and the second current collecting member. On the one hand, the first insulating member having such a structure can surround the outside of the first current collecting member and the second current collecting member through the first insulator, so that the first current collecting member and the second current collecting member can be separated from the shell, thereby being conducive to reducing the risk of short circuit between the first current collecting member and the second current collecting member and the shell. On the other hand, the first current collecting member and the second current collecting member can be separated through the second insulator, thereby being conducive to reducing the risk of short circuit between the first current collecting member and the second current collecting member.

In some embodiments, the shell includes a case and an end cover; an accommodating cavity having an opening is formed inside the case, and the accommodating cavity is configured to accommodate the electrode assembly; and the end cover closes the opening, where the end cover is the wall portion.

In the above technical solution, by configuring the wall portion of the shell as the end cover of the shell for closing the opening of the case, the battery cell having such a structure facilitates the assembly of the electrode terminal on the end cover and can reduce the difficulty of electrically connecting the first and second tabs to the end cover and the electrode terminal respectively, thereby being conducive to reducing the manufacturing difficulty of the battery cell to improve the production efficiency of the battery cell.

In some embodiments, the shell includes a case and an end cover; the case includes a side wall and a bottom wall; the side wall encloses the periphery of the bottom wall; along the axial direction of the main body part, one end of the side wall is connected to the bottom wall, and the other end is enclosed to form an opening; the side wall and the bottom wall together define an accommodating cavity for accommodating the electrode assembly; and the end cover closes the opening, where the bottom wall is the wall portion.

In the above technical solution, by configuring the wall portion of the shell as the bottom wall of the case, the wall portion where the electrode terminal is arranged and used for electrical connection with the first tab can be kept away from the end cover, thereby reducing the influence of the stress generated when the end cover and the case are connected to each other on the wall portion or the electrode terminal arranged on the wall portion, and being conducive to improving the use reliability and prolonging the service life of the battery cell.

According to a third aspect, an embodiment of the present application further provides a battery, including the above battery cell.

According to a fourth aspect, an embodiment of the present application further provides an electrical apparatus, including the above battery cell, the battery cell being configured to provide electric energy.

BRIEF DESCRIPTION OF THE DRAWINGS

To more clearly describe the technical solutions of the embodiments of the present application, the drawings to be used in the embodiments will be briefly introduced below, and it should be understood that the following drawings only show some embodiments of the present application, and therefore should not be considered as limiting the scope of the present application. For those of ordinary skills in the art, other relevant drawings may also be obtained based on these drawings without creative efforts.

Figure 1:
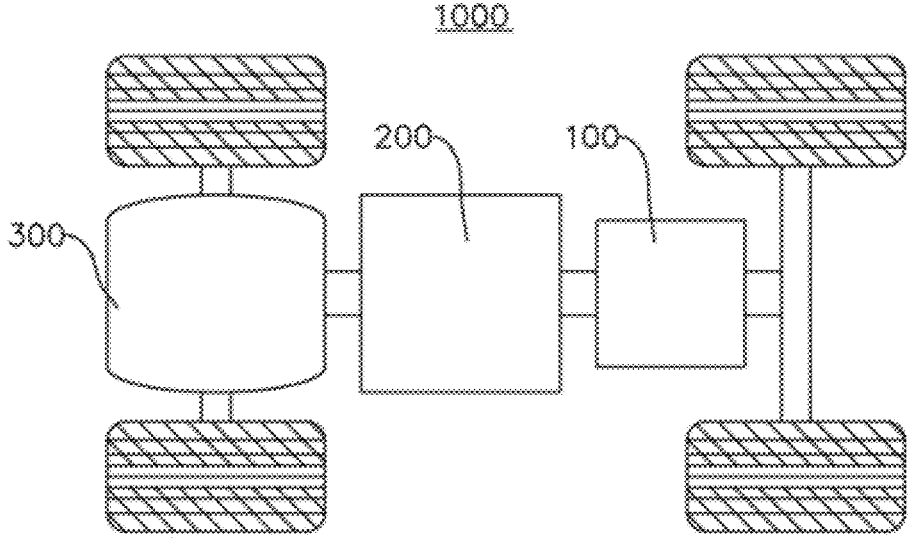
FIG. 1 is a schematic structural view of a vehicle according to some embodiments of the present application.

Icons: 1000—vehicle; 100—battery; 10—box body; 11—first box body; 12—second box body; 20—battery cell; 21—shell; 211—case; 2111—opening; 2112—side wall; 2113—bottom wall; 2113a—assembling hole; 212—end cover; 213—wall portion; 22—electrode assembly; 221—main body part; 2211—central through hole; 222—first tab; 2221—first surface; 2222—first end face; 2223—second end face; 2224—first edge; 2225—second edge; 223—second tab; 2231—second surface; 2232—third end face; 2233—fourth end face; 2234—third edge; 2235—fourth edge; 23—electrode terminal; 24—second insulating member; 25—pressure relief component; 26—first current collecting member; 27—second current collecting member; 28—first insulating member; 281—first mounting hole; 282—second mounting hole; 283—first insulator; 284—second insulator; 200—controller; 300—motor; X—axial direction of main body part; Y—circumferential direction of main body part.

DETAILED DESCRIPTION

In order to make the objects, technical solutions and advantages of embodiments of the present application clearer, the technical solutions in the embodiments of the present application will be clearly described below with reference to the drawings for the embodiments of the present application. Apparently, the described embodiments are some of, rather than all of, the embodiments of the present application. All the other embodiments obtained by a person of ordinary skill in the art based on the embodiments of the present application without any creative effort shall fall within the scope of protection of the present application.

Unless otherwise defined, all technical and scientific terms used in the present application shall have the same meanings as those generally understood by those skilled in the art of the present application. The terms used in the present application in the specification of application are merely for the purpose of describing specific embodiments and are not intended to limit the present application. The terms "include" and "have" and any variations thereof in the specification and claims and the above brief description of the drawings of the present application are intended to cover non-exclusive inclusion. The terms "first", "second", etc. in the specification and the claims of the present application as well as the above drawings are used to distinguish different objects, rather than to describe a specific order or primary-secondary relationship.

The phrase "embodiment" referred to in the present application means that the descriptions of specific features, structures, and characteristics in combination with the embodiment are included in at least one embodiment of the present application. The appearance of this phrase in various places in the specification does not necessarily refer to the same embodiment, nor is it a separate or alternative embodiment that is mutually exclusive with other embodiments.

In the description of the present application, it should be noted that the terms "mounting," "connecting," "connection" and "attachment" should be understood in a broad sense, unless otherwise explicitly specified or defined, for example, it may be a fixed connection, a detachable connection or an integrated connection; and may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relation describing associated objects, which means that there may be three relations, for example, A and/or B may represent three situations: A exists alone, both A and B exist, and B exists alone. In addition, the character "/" in the present application generally means that the associated objects before and after it are in an "or" relationship.

In the embodiments of the present application, the same reference signs denote the same components, and for the sake of brevity, detailed descriptions of the same components are omitted in different embodiments. It should be understood that the thickness, length, width and other dimensions of the various components in the embodiments of the present application shown in the drawings, as well as the overall thickness, length, width and other dimensions of an integrated apparatus, are for illustrative purposes only, and should not constitute any limitation to the present application.

In the present application, the "plurality of" refers to more than two (including two).

In the embodiments of the present application, a battery cell may be a secondary battery. The secondary battery refers to a battery cell that, after being discharged, can activate an active material by charging for continued use.

The battery cell may be a lithium-ion battery, a sodium-ion battery, a sodium/lithium-ion battery, a lithium metal battery, a sodium metal battery, a lithium sulfur battery, a magnesium-ion battery, a nickel hydrogen battery, a nickel cadmium battery, a lead storage battery, and the like. The embodiments of the present application are not limited to this.

The battery cell generally includes an electrode assembly. The electrode assembly includes a positive electrode, a negative electrode and a spacer. During charging and discharging of the battery cell, active ions (such as lithium ions) are intercalated and deintercalated back and forth between the positive electrode and the negative electrode. The spacer is arranged between the positive electrode and the negative electrode, and can function to prevent short circuit between the positive electrode and the negative electrode and allow the active ions to pass through.

In some embodiments, the positive electrode may be a positive electrode plate, and the positive electrode plate may include a positive electrode current collector and a positive electrode active material arranged on at least one surface of the positive electrode current collector.

As an example, the positive electrode current collector has two surfaces opposite in its own thickness direction, and the positive electrode active material is arranged on either one or both of the two opposite surfaces of the positive electrode current collector.

As an example, the positive electrode current collector may be a metal foil or composite current collector. For example, if it is the metal foil, silver-plated aluminum, silver-plated stainless steel, stainless steel, copper, aluminum, nickel, baked carbon, carbon, nickel or titanium and the like can be adopted. The composite current collector may include a high molecular material substrate and a metal layer. The composite current collector may be formed by forming a metal material (such as aluminum, aluminum alloy, nickel, nickel alloy, titanium, titanium alloy, silver, and silver alloy) on a high molecular material substrate (such as a substrate of polypropylene, polyethylene terephthalate, polybutylene terephthalate, polystyrene, or polyethylene).

As an example, the positive electrode active material may include at least one of the following materials: a lithium-containing phosphate, a lithium transition metal oxide, and a respective modified compound thereof. However, the present application is not limited to these materials, and other conventional materials useful as positive electrode active materials for batteries can also be used. One of these positive electrode active materials may be used alone, or two or more of these positive electrode active materials may be used in combination. Examples of lithium-containing phosphates may include, but are not limited to, at least one of lithium iron phosphate (e.g., $LiFePO_4$ (also abbreviated as LFP)), lithium iron phosphate-carbon composite, lithium manganese phosphate (e.g., $LiMnPO_4$), lithium manganese phosphate-carbon composite, lithium iron manganese phosphate, and lithium iron manganese phosphate-carbon composite. Examples of the lithium transition metal oxide may include, but are not limited to, at least one of a lithium-cobalt oxide (such as $LiCoO_2$), lithium-nickel oxide (such as $LiNiO_2$), lithium-manganese oxide (such as $LiMnO_2$ and $LiMn_2O_4$), lithium-nickel-cobalt oxide, lithium-manganese-cobalt oxide, lithium-nickel-manganese oxide, lithium-nickel-cobalt-manganese oxide (such as $LiNi_{1/3}Co_{1/3}Mn_{1/3}O_2$ (also abbreviated as $NCM_{333}$), $LiNi_{0.5}Co_{0.2}Mn_{0.3}O_2$ (also abbreviated as $NCM_{523}$), $LiNi_{0.5}Co_{0.25}Mn_{0.25}O_2$ (also abbreviated as $NCM_{211}$), $LiNi_{0.6}Co_{0.2}Mn_{0.2}O_2$ (also abbreviated as $NCM_{622}$), $LiNi_{0.8}Co_{0.1}Mn_{0.1}O_2$ (also abbreviated as $NCM_{811}$), lithium-nickel-cobalt-aluminum oxide (such as $LiNi_{0.85}Co_{0.15}Al_{0.05}O_2$) and their respective modified compounds.

In some embodiments, a foam metal may be used as the positive electrode. The foam metal may be foam nickel, foam copper, foam aluminum, foam alloy, or foam carbon, etc. When the foam metal is used as the positive electrode, the surface of the foam metal may not be provided with a positive electrode active material, and of course, may also be provided with a positive electrode active material. For example, a lithium source material, a potassium metal, or a sodium metal may also fill or/and be deposited in the foam metal, and the lithium source material is a lithium metal and/or a lithium-rich material.

In some embodiments, the negative electrode may be a negative electrode plate, and the negative electrode plate may include a negative electrode current collector.

For example, a metal foil, a foam metal, or a composite current collector may be used as the negative electrode current collector. For example, as the metal foil, silver surface-treated aluminum or stainless steel, stainless steel, copper, aluminum, nickel, baked carbon, carbon, nickel, titanium, or the like can be used. The foam metal may be foam nickel, foam copper, foam aluminum, foam alloy, or foam carbon, etc. The composite current collector may include a high molecular material substrate and a metal layer. The composite current collector may be formed by forming a metal material (such as copper, copper alloy, nickel, nickel alloy, titanium, titanium alloy, silver, and silver alloy) on a high molecular material substrate (such as a substrate of polypropylene, polyethylene terephthalate, polybutylene terephthalate, polystyrene, or polyethylene).

For example, the negative electrode plate may include a negative electrode current collector and a negative electrode active material arranged on at least one surface of the negative electrode current collector.

For example, the negative electrode current collector has two surfaces opposite to each other in its own thickness direction, and the negative electrode active material is arranged on either one or both of the two opposite surfaces of the negative electrode current collector.

For example, the negative electrode active material for the battery cell that is commonly known in this field can be used as the negative electrode active material. For example, the negative electrode active material may include at least one of the following materials: artificial graphite, natural graphite, soft carbon, hard carbon, a silicon-based material, a tin-based material, lithium titanate, and the like. The silicon-based material may be selected from at least one of elemental silicon, silicon-oxygen compound, silicon-carbon complex, silicon-nitrogen complex, and silicon alloy. The tin-based material may be selected from at least one of elemental tin, tin-oxygen compound, and tin alloy. However, the present application is not limited to these materials, and other conventional materials useful as negative electrode active materials for batteries can also be used. One of these negative electrode active materials may be used alone, or two or more of these negative electrode active materials may be used in combination.

In some embodiments, the material of the positive electrode current collector may be aluminum, and the material of the negative electrode current collector may be copper.

In some embodiments, the electrode assembly further includes a spacer, and the spacer is arranged between the positive electrode and the negative electrode.

In some embodiments, the spacer is a separator. There may be various types of separators, and any well-known separator with a porous structure having good chemical stability and mechanical stability may be selected.

For example, the material of the separator may include at least one of glass fiber, non-woven fabric, polyethylene, polypropylene, and polyvinylidene fluoride. The separator may be a single-layer film or a multi-layer composite film. When the separator is the multi-layer composite film, the materials of all layers may be the same or different. The spacer can be an independent component positioned between the positive electrode and the negative electrode, and can also be attached to the surfaces of the positive electrode and the negative electrode.

In some embodiments, the spacer is a solid electrolyte. The solid electrolyte is arranged between the positive electrode and the negative electrode, and plays roles in transmitting ions and isolating the positive electrode from the negative electrode.

In some embodiments, the battery cell further includes an electrolyte, and the electrolyte plays a role in conducting ions between the positive electrode and the negative electrode. The electrolyte may be liquid, gel or solid. The liquid electrolyte includes electrolyte salt and a solvent.

In some embodiments, the electrolyte salt may include at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoroborate, lithium bis(oxalate) borate, lithium difluorooxalate phosphate and lithium tetrafluoroborate.

In some embodiments, the solvent may include at least one of ethylene carbonate, propylene carbonate, methyl ethyl carbonate, diethyl carbonate, dimethyl carbonate, dipropyl carbonate, methyl propyl carbonate, ethyl propyl carbonate, butyl carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, tetramethylene sulfone, dimethyl sulfolane, methyl ethyl sulfone and ethyl sulfone. The solvent may be selected from ether solvents. The ether solvent may include one or more selected from the group consisting of ethylene glycol dimethyl ether, ethylene glycol diethyl ether, diethylene glycol dimethyl ether, tridiethylene glycol dimethyl ether, tetraethylene glycol dimethyl ether, 1,3-dioxolane, tetrahydrofuran, methyltetrahydrofuran, diphenyl ether, or crown ether.

The gel electrolyte includes a skeleton network with a polymer as the electrolyte, paired with an ionic liquid-lithium salt.

The solid electrolyte includes a polymer solid electrolyte, an inorganic solid electrolyte, and a composite solid electrolyte.

For example, the polymer solid electrolyte may be polyether (polyoxyethylene), polysiloxane, polycarbonate, polyacrylonitrile, polyvinylidene fluoride, polymethyl methacrylate, a single-ion polymer, a polyionic liquid-lithium salt, cellulose and the like.

For example, the inorganic solid electrolyte may include one or more of an oxide solid electrolyte (crystalline perovskite, a sodium superconducting ion conductor, garnet and an amorphous LiPON film), a sulfide solid electrolyte (a crystalline lithium superconducting ion conductor (lithium germanium phosphorus sulfur and sulfur silver germanium ore), and amorphous sulfide), a halide solid electrolyte, a nitride solid electrolyte, and a hydride solid electrolyte.

For example, the composite solid electrolyte is formed by adding an inorganic solid electrolyte filler into the polymer solid electrolyte.

In some embodiments, the electrode assembly is of a wound structure. The positive electrode plate and the negative electrode plate are wound into the wound structure.

In some embodiments, the electrode assembly is provided with tabs, and the tabs may conduct the current out from the electrode assembly. The tabs include a positive tab and a negative tab.

In some embodiments, the battery cell may include a shell. The shell is configured to package components such as the electrode assembly and the electrolyte. The shell may be a steel shell, an aluminum shell, a plastic shell (such as polypropylene), a composite metal shell (such as a copper-aluminum composite shell), an aluminum-plastic film, or the like.

For example, the battery cell may be a cylindrical battery cell, a prismatic battery cell, a pouch cell, or a battery cell in another shape.

The battery mentioned in the embodiments of the present application refers to a single physical module including one or more battery cells to provide a higher voltage and capacity.

In some embodiments, the battery may be a battery module. When there are a plurality of battery cells, the plurality of battery cells are arranged and fixed to form a battery module.

In some embodiments, the battery may be a battery pack. The battery pack includes a box body and a battery cell. The battery cell or the battery module is accommodated in the box body.

In some embodiments, the box body may be used as a part of a chassis structure of a vehicle. For example, a part of the box body may become at least a part of a floor of a vehicle, or a part of the box body may become at least a part of a cross beam and a longitudinal beam of a vehicle.

In some embodiments, the battery may be an energy storage apparatus. The energy storage apparatus includes an energy storage container, an energy storage cabinet, or the like.

The battery has outstanding advantages such as high energy density, low environmental pollution, high power density, long service life, wide application range, and low self-discharge coefficient, thus being an important component for the current development of new energy.

For a general battery cell, the battery cell usually includes a shell and an electrode assembly accommodated in the shell. The electrode assembly is usually provided with a main body part and positive and negative tabs. The positive and negative tabs are configured to output or input electric energy of the electrode assembly. In order to save the space occupied by the electrode assembly in the shell to improve the energy density of the battery cell, especially in a battery cell with a cylindrical structure, in the related art, the positive and negative tabs of the electrode assembly are usually arranged at the same end of the main body part, and the positive and negative tabs are the same in shape and size, so as to achieve a structure in which the electrode assembly has tabs on the same side, thereby saving the space occupied by the electrode assembly in the shell. However, the electrode assembly having such a structure is not convenient to effectively distinguish and identify the positive and negative tabs when being subsequently assembled into the shell, and the electrode assembly needs to be positioned secondarily to achieve electrical connection between the positive and negative tabs and the corresponding output poles, thereby being difficult to assemble the electrode assembly into the shell and not conducive to improving the assembly efficiency of the electrode assembly.

Based on the above considerations, in order to solve the problem that it is difficult to assemble the electrode assembly into the shell, an embodiment of the present application provides an electrode assembly. The electrode assembly includes a main body part, a first tab and a second tab. The main body part is cylindrical. The first tab and the second tab have opposite polarities. Along the axial direction of the main body part, the first tab and the second tab are arranged at the same end of the main body part. The electrical conductivity of the first tab is $X_1$, and the electrical conductivity of the second tab is $X_2$, satisfying $X_2 > X_1$. Along the axial direction of the main body part, the first tab has a first surface away from the main body part, and the second tab has a second surface away from the main body part, the area of the first surface being larger than the area of the second surface.

In the electrode assembly having such a structure, by arranging the first tab and the second tab of the electrode assembly at the same end of the main body part in the axial direction of the main body part, it is conducive to saving the space occupied by the electrode assembly in the axial direction of the main body part, so as to improve the energy density of a battery cell having such an electrode assembly. By setting the area of the first surface of the first tab away from the main body part in the axial direction of the main body part to be larger than the area of the second surface of the second tab away from the main body part in the axial direction of the main body part, the areas of regions of the first tab and the second tab configured to be connected to the corresponding output poles are different, so that during the assembly of a battery cell, it is convenient to distinguish and identify the first tab and the second tab with different polarities, and the first tab and the second tab can be assembled with the corresponding output poles respectively without secondary positioning of the electrode assembly, thereby being conducive to reducing the difficulty in the subsequent assembly of the electrode assembly to improve the assembly efficiency of the electrode assembly.

In addition, by setting the electrical conductivity of the first tab to be smaller than the electrical conductivity of the second tab, the conductivity of the first tab is weaker than the conductivity of the second tab. Thus, by setting the area of the first surface of the first tab to be larger than the area of the second surface of the second tab, the area of the first surface of the first tab with smaller electrical conductivity connected to the output pole is larger, while the area of the second surface of the second tab with larger electrical conductivity connected to the output pole is smaller, which is conducive to achieving the close flow capacity of the first tab and the second tab and reasonably designing the sizes of the first tab and the second tab, thereby effectively alleviating the phenomenon of excess flow area in the first tab or the second tab, so as to reasonably optimize the space and weight occupied by the first tab or the second tab, which is conducive to improving the energy density of the battery cell.

The electrode assembly disclosed in the embodiments of the present application may be used in, but not limited to, an electrical apparatus such as a vehicle, a ship or an aircraft. A power system of the electrical apparatus may be composed of the battery cell, the battery, and the like disclosed in the present application, thereby being conducive to alleviating the phenomenon of excessive difficulty in the subsequent assembly process of the electrode assembly to improve the assembly efficiency of the battery cell.

An embodiment of the present application provides an electrical apparatus in which a battery is used as a power source. The electrical apparatus may be, but is not limited to, a mobile phone, a tablet, a laptop, an electric toy, an electric tool, a storage battery car, an electric vehicle, a ship, a spacecraft, etc. The electric toy may include a fixed or mobile electric toy, such as a game console, an electric car toy, an electric ship toy, an electric airplane toy, and the like. The spacecraft may include an airplane, a rocket, a space shuttle, a spaceship, and the like.

For convenience of description, the following embodiments are illustrated by taking an example in which an electrical apparatus according to an embodiment of the present application is a vehicle.

Referring to FIG. 1, FIG. 1 is a schematic structural view of a vehicle 1000 according to some embodiments of the present application. The vehicle 1000 may be a fuel vehicle, a gas vehicle, or a new energy vehicle. The new energy vehicle may be an all-electric vehicle, a hybrid vehicle, an extended-range vehicle, or the like. A battery 100 is provided in the vehicle 1000. The battery 100 may be arranged at the bottom of the vehicle 1000, or the head of the vehicle 1000, or the tail of the vehicle 1000. The battery 100 may be configured to supply power to the vehicle 1000. For example, the battery 100 may be used as an operating power source or usage power source for the vehicle 1000. The vehicle 1000 may further include a controller 200 and a motor 300. The controller 200 is used for controlling the battery 100 to supply power to the motor 300, for example, to satisfy the operating power demand when the vehicle 1000 is starting, navigating, and traveling.

In some embodiments of the present application, the battery 100 can not only be used as the operating power source or usage power source for the vehicle 1000, but also as the driving power source for the vehicle 1000 to replace or partially replace fuel or natural gas to provide driving power for the vehicle 1000.

Figure 2:
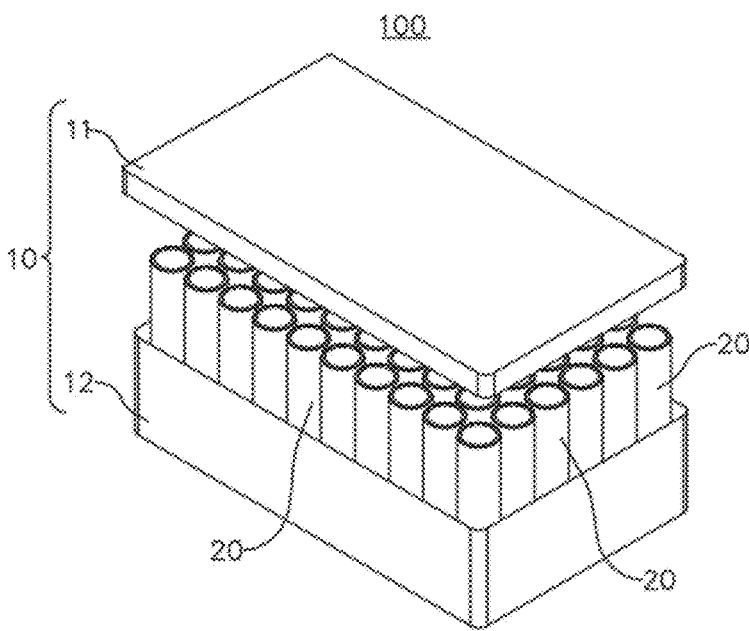
FIG. 2 is an exploded structural view of a battery according to some embodiments of the present application.
Figure 3:
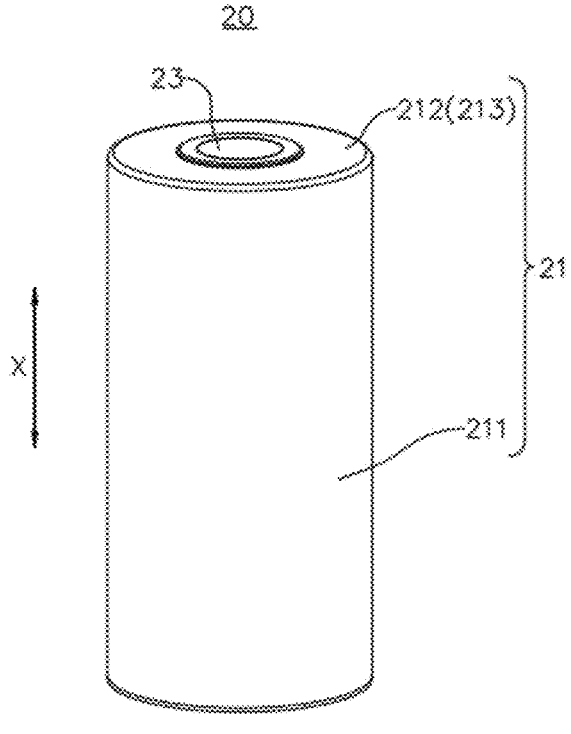
FIG. 3 is a schematic structural view of a battery cell according to some embodiments of the present application.

Referring to FIG. 2 and FIG. 3, FIG. 2 is an exploded structural view of a battery 100 according to some embodiments of the present application, and FIG. 3 is a schematic structural view of a battery cell 20 according to some embodiments of the present application. The battery 100 includes a box body 10 and battery cells 20, and the battery cells 20 are accommodated in the box body 10, where the box body 10 is configured to provide an assembling space for the battery cells 20, and the box body 10 may be of various structures. In some embodiments, the box 10 includes a first box body 11 and a second box body 12. The first box body 11 and the second box body 12 cover each other, and the first box body 11 and the second box body 12 together define an assembling space for accommodating the battery cell 20. The second box body 12 may be of a hollow structure with an open end, the first box body 11 may be of a plate-like structure, and the first box body 11 covers the open side of the second box body 12, so that the first box body 11 and the second box body 12 together define the assembling space. Both the first box body 11 and the second box body 12 may also be of a hollow structure with an open side, and the open side of the first box body 11 covers the open side of the second box body 12.

Of course, the box body 10 formed by the first box body 11 and the second box body 12 may be in various shapes, such as a cylinder, a cuboid, or a cube. Exemplarily, in FIG. 2, the box body 10 is in a cuboid shape.

In the battery 100, one battery cell 20 or a plurality of battery cells 20 may be arranged in the box body 10. If a plurality of battery cells 20 are arranged in the box body 10, the plurality of battery cells 20 may be connected in series, parallel or series and parallel, where the series-parallel connection means that some of the plurality of battery cells 20 are connected in series and some are connected in parallel. The plurality of battery cells 20 may be directly connected in series, parallel or series and parallel together, and then, the whole formed by the plurality of battery cells 20 is accommodated in the box body 10. Of course, the battery 100 may also be in the form of a battery module composed of a plurality of battery cells 20 in series, parallel or series and parallel first, and then, a plurality of battery modules are connected in series, parallel or series and parallel to form a whole which is accommodated in the box body 10.

In some embodiments, the battery 100 may further include other structures. For example, the battery 100 may further include a convergence component, and the plurality of battery cells 20 may be connected through the convergence component so as to achieve electrical connection between the plurality of battery cells 20.

Each battery cell 20 may be a secondary battery or a primary battery, or may be a lithium-sulfur battery, a sodium-ion battery or a magnesium-ion battery, but is not limited thereto. The battery cell 20 may be in a cylinder shape, a prism shape or other shapes. Exemplarily, in FIG. 3, the battery cell 20 is of a cylinder structure.

Figure 4:
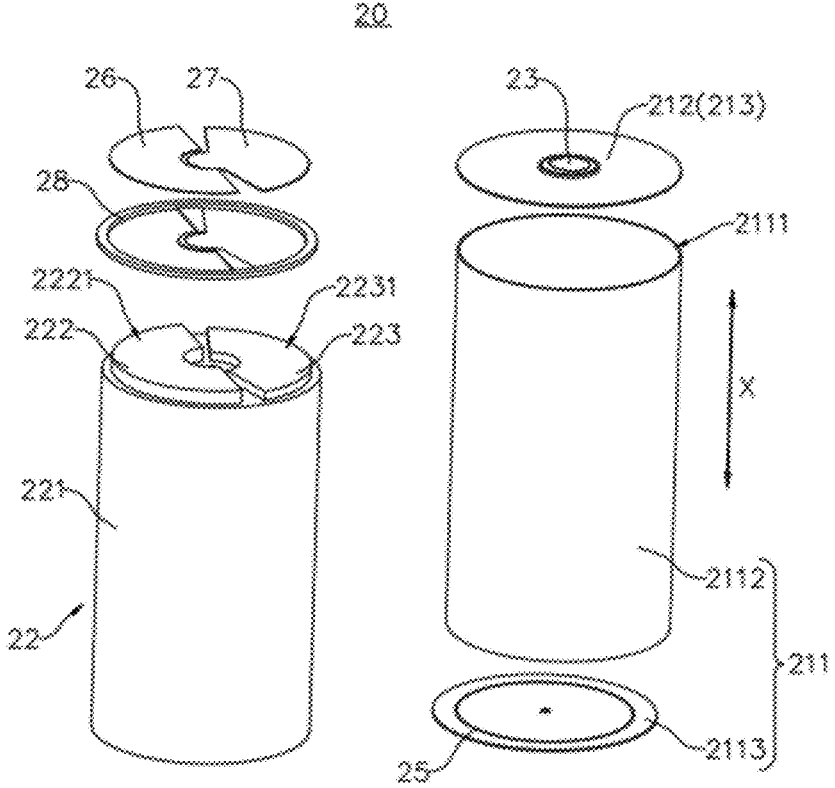
FIG. 4 is an exploded structural view of a battery cell according to some embodiments of the present application.
Figure 5:
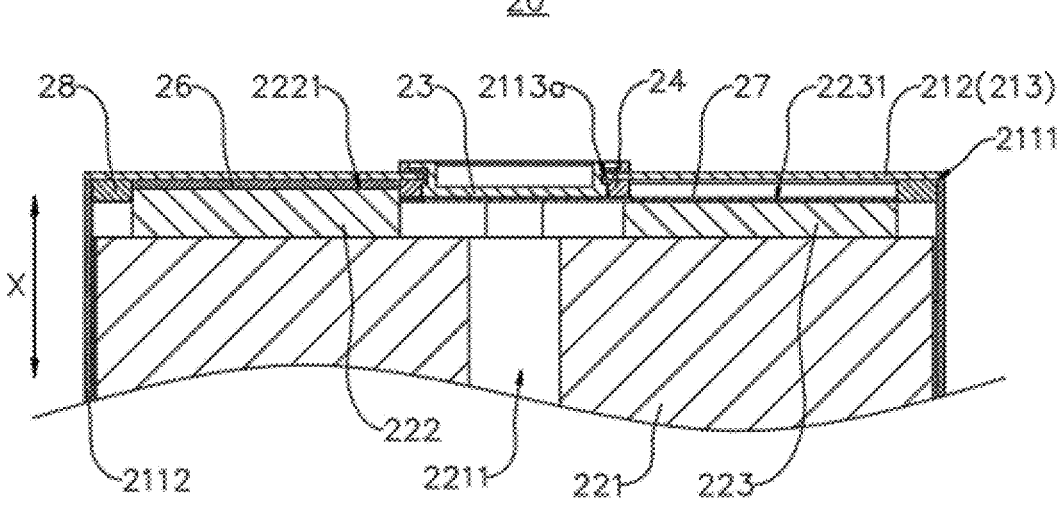
FIG. 5 is a partial sectional view of a battery cell according to some embodiments of the present application.

Referring to FIG. 3 and further referring to FIG. 4 and FIG. 5, FIG. 4 is an exploded structural view of a battery cell 20 according to some embodiments of the present application, and FIG. 5 is a partial sectional view of a battery cell 20 according to some embodiments of the present application. The battery cell 20 includes a shell 21 and an electrode assembly 22, and the electrode assembly 22 is accommodated in the shell 21.

The shell 21 may be further configured to accommodate an electrolyte, such as an electrolyte solution. The shell 21 may also be made of various materials, such as copper, iron, aluminum, steel, or aluminum alloy.

In some embodiments, the shell 21 may include a case 211 and an end cover 212. An accommodating cavity is formed inside the case 211, the accommodating cavity is configured to accommodate the electrode assembly 22, and the accommodating cavity has an opening 2111. In other words, the case 211 is of a hollow structure having the opening 2111 at one end, and the end cover 212 covers the opening 2111 of the case 211 and forms a sealed connection to form a sealed space for accommodating the electrode assembly 22 and the electrolyte.

When the battery cell 20 is assembled, the electrode assembly 22 may be placed in the case 211 first, the case 211 is filled with the electrolyte, and then the opening 2111 of the case 211 is covered with the end cover 212, so as to complete the assembly of the battery cell 20.

The case 211 may be in various shapes, such as a cylinder or a prism structure. The shape of the case 211 may be determined according to the specific shape of the electrode assembly 22. For example, if the electrode assembly 22 is of a cylinder structure, the case 211 having a cylinder structure may be selected. Of course, the end cover 212 may also be of various structures. For example, the end cover 212 may be of a plate-like structure or a hollow structure with an open end. Exemplarily, in FIG. 4 and FIG. 5, the case 211 is of a cylinder structure, and the central axis of the case 211 extends along the axial direction X of the main body part.

In some embodiments, referring to FIG. 3 and FIG. 4, the case 211 may include a side wall 2112 and a bottom wall 2113. The side wall 2112 is arranged around the bottom wall 2113. Along the axial direction X of the main body part, the bottom wall 2113 is arranged opposite to the end cover 212, one end of the side wall 2112 is connected to the bottom wall 2113, and the other end is enclosed to form an opening 2111. It should be noted that the side wall 2112 and the bottom wall 2113 may be of an integrally formed structure, for example, may be formed by a stamping or casting process. Of course, the side wall 2112 and the bottom wall 2113 may also be of split structures, that is, the side wall 2112 and the bottom wall 2113 are separately arranged, and the bottom wall 2113 may be connected to the side wall 2112 by means of welding or bonding.

Exemplarily, in FIG. 4, the side wall 2112 and the bottom wall 2113 are of split structures, and the bottom wall 2113 and the side wall 2112 are connected by welding. In this embodiment, the electrode assembly 22 may be first assembled inside the side wall 2112, and after the side wall 2112 and the end cover 212 are assembled with each other, the bottom wall 2113 and the side wall 2112 are connected by welding. It should be noted that in the embodiment where the side wall 2112 and the bottom wall 2113 of the case 211 are of split structures, the end cover 212 and the side wall 2112 may be of an integrally formed structure or split structures. Exemplarily, in FIG. 4, the end cover 212 and the side wall 2112 are of split structures, and the end cover 212 is welded to an end of the side wall 2112 away from the bottom wall 2113 in the axial direction X of the main body part.

It should be noted that the electrode assembly 22 is a component where electrochemical reactions occur in the battery cell 20. The electrode assembly 22 may be of various structures. Exemplarily, the electrode assembly 22 may be of a wound structure formed by winding a positive electrode plate, a spacer and a positive electrode plate, the electrode assembly 22 is cylindrical, and the central axis of the electrode assembly 22 extends along the axial direction X of the main body part.

Exemplarily, the spacer is a separator, and the main material of the separator may be selected from at least one of glass fiber, non-woven fabric, polyethylene, polypropylene, and polyvinylidene fluoride.

Figure 6:
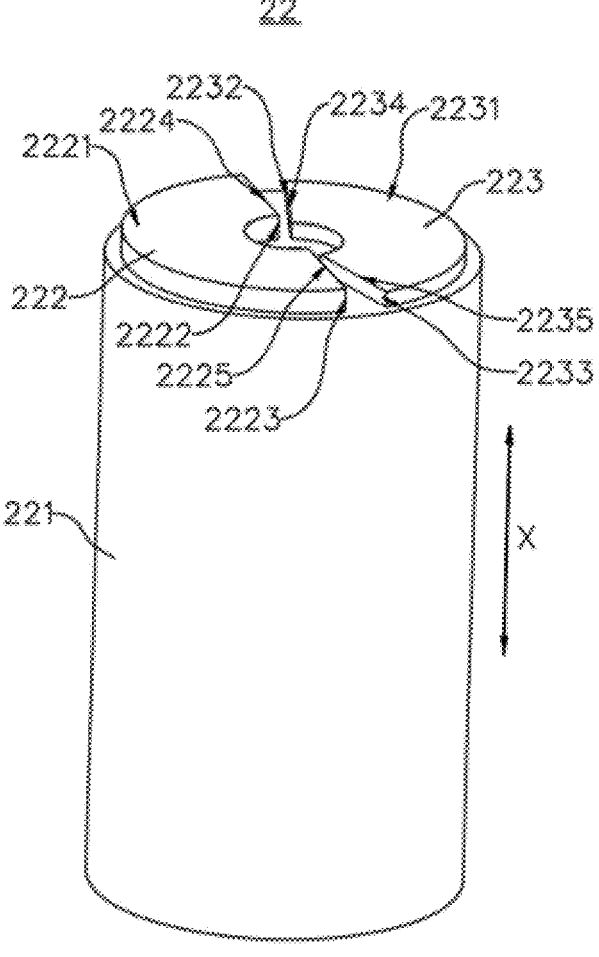
FIG. 6 is a schematic structural view of an electrode assembly according to some embodiments of the present application.
Figure 7:
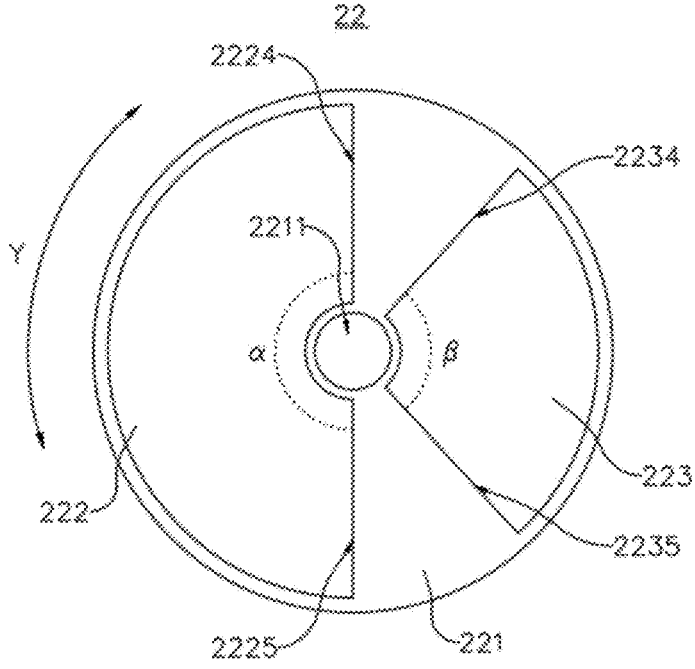
FIG. 7 is a top view of an electrode assembly according to some embodiments of the present application.

According to some embodiments of the present application, referring to FIG. 4 and FIG. 5 and further referring to FIG. 6 and FIG. 7, FIG. 6 is a schematic structural view of an electrode assembly 22 according to some embodiments of the present application, and FIG. 7 is a top view of an electrode assembly 22 according to some embodiments of the present application. The present application provides an electrode assembly 22. The electrode assembly 22 includes a main body part 221, a first tab 222 and a second tab 223. The main body part 221 is cylindrical. The first tab 222 and the second tab 223 have opposite polarities. Along the axial direction X of the main body part, the first tab 222 and the second tab 223 are arranged at the same end of the main body part 221. The electrical conductivity of the first tab 222 is $X_1$, and the electrical conductivity of the second tab 223 is $X_2$, satisfying $X_2 > X_1$. Along the axial direction X of the main body part, the first tab 222 has a first surface 2221 away from the main body part 221, and the second tab 223 has a second surface 2231 away from the main body part 221, the area of the first surface 2221 being larger than the area of the second surface 2231.

The main body part 221 is of a cylinder structure, and the central axis of the main body part 221 extends along the axial direction X of the main body part. The main body part 221 is a region where the electrode assembly 22 undergoes chemical reactions in the battery cell 20. The main body part 221 is of a structure formed by winding a region of the positive electrode plate coated with a positive electrode active material layer, a spacer, and a region of the negative electrode plate coated with a negative electrode active material layer, and mainly works by moving metal ions between the positive electrode plate and the negative electrode plate with opposite polarities.

The first tab 222 and the second tab 223 are respectively configured to output or input the positive and negative electrodes of the electrode assembly 22. If the first tab 222 is configured to input or output the positive electrode of the electrode assembly 22, the first tab 222 is a component formed by mutually stacking and connecting the regions on the positive electrode plate that are not coated with the positive electrode active material layer; and correspondingly, if the second tab 223 is configured to output or input the negative electrode of the electrode assembly 22, the second tab 223 is a component formed by mutually stacking and connecting the regions on the negative electrode plate that are not coated with the negative electrode active material layer. If the first tab 222 is configured to output or input the negative electrode of the electrode assembly 22, the first tab 222 is a component formed by mutually stacking and connecting the regions on the negative electrode plate that are not coated with the negative electrode active material layer; and correspondingly, if the second tab 223 is configured to input or output the positive electrode of the electrode assembly 22, the second tab 223 is a component formed by mutually stacking and connecting the regions on the positive electrode plate that are not coated with the positive electrode active material layer.

In the embodiments of the present application, the first tab 222 is configured to output or input the positive electrode of the electrode assembly 22, and the second tab 223 is configured to output or input the negative electrode of the electrode assembly 22. Exemplarily, the material of the first tab 222 may be aluminum, and the material of the second tab 223 may be copper.

The electrical conductivity is often called conductivity, which is a measured value for representing the strength of the ability of a material to transmit current. The electrical conductivity of the first tab 222 and the electrical conductivity of the second tab 223 may be measured by a conductivity meter or an ohmmeter.

Since the first tab 222 and the second tab 223 are usually of structures made of different materials, which leads to different conductivities of the first tab 222 and the second tab 223, different flow areas are required. Therefore, by setting the projection area of the first tab 222 and the projection area of the second tab 223 to different structures, different flow requirements of the first tab 222 and the second tab 223 of the electrode assembly 22 can be achieved to adapt to different usage scenarios, thereby being conducive to extending the application scope of the electrode assembly 22. Exemplarily, the first tab 222 is configured to output or input the positive electrode of the electrode assembly 22, and the material of the first tab 222 may be aluminum; and the second tab 223 is configured to output or input the negative electrode of the electrode assembly 22, and the material of the second tab 223 may be copper, so that the electrical conductivity of the second tab 223 is greater than the electrical conductivity of the first tab 222.

It should be noted that the first surface 2221 of the first tab 222 is configured to be connected to one output pole of the battery cell 20, and the second surface 2231 of the second tab 223 is configured to be connected to another output pole of the battery cell 20, so as to input or output electric energy of the battery cell 20. Exemplarily, referring to FIG. 4 and FIG. 5, the shell 21 of the battery cell 20 has a wall portion 213, and the first tab 222 and the second tab 223 are both arranged at one end of the main body part 221 facing the wall portion 213. An electrode terminal 23 is mounted on the wall portion 213 in an insulated manner. The first surface 2221 of the first tab 222 is configured to be connected to the wall portion 213, and the second surface 2231 of the second tab 223 is configured to be connected to the electrode terminal 23.

The first surface 2221 is an end face of the first tab 222 facing the wall portion 213 in the axial direction X of the main body part, and the area of the first surface 2221 is the area of the end face of the first tab 222 facing the wall portion 213 in the axial direction X of the main body part. The second surface 2231 is an end face of the second tab 223 facing the wall portion 213 in the axial direction X of the main body part, and the area of the second surface 2231 is the area of the end face of the second tab 223 facing the wall portion 213 in the axial direction X of the main body part.

By arranging the first tab 222 and the second tab 223 of the electrode assembly 22 at the same end of the main body part 221 in the axial direction X of the main body part, it is conducive to saving the space occupied by the electrode assembly 22 in the axial direction X of the main body part, so as to improve the energy density of the battery cell 20 having such an electrode assembly 22. By setting the area of the first surface 2221 of the first tab 222 away from the main body part 221 in the axial direction X of the main body part to be larger than the area of the second surface 2231 of the second tab 223 away from the main body part 221 in the axial direction X of the main body part, the areas of regions of the first tab 222 and the second tab 223 configured to be connected to the corresponding output poles are different, so that during the assembly of the battery cell 20, it is convenient to distinguish and identify the first tab 222 and the second tab 223 with different polarities, and the first tab 222 and the second tab 223 can be assembled with the corresponding output poles respectively without secondary positioning of the electrode assembly 22, thereby being conducive to reducing the difficulty in the subsequent assembly of the electrode assembly 22 to improve the assembly efficiency of the electrode assembly 22. In addition, by setting the electrical conductivity of the first tab 222 to be smaller than the electrical conductivity of the second tab 223, the conductivity of the first tab 222 is weaker than the conductivity of the second tab 223. Thus, by setting the area of the first surface 2221 of the first tab 222 to be larger than the area of the second surface 2231 of the second tab 223, the area of the first surface 2221 of the first tab 222 with smaller electrical conductivity connected to the output pole is larger, while the area of the second surface 2231 of the second tab 223 with larger electrical conductivity connected to the output pole is smaller, which is conducive to achieving the close flow capacity of the first tab 222 and the second tab 223 and reasonably designing the sizes of the first tab 222 and the second tab 223, thereby effectively alleviating the phenomenon of excess flow area in the first tab 222 or the second tab 223, so as to reasonably optimize the space and weight occupied by the first tab 222 or the second tab 223, which is conducive to improving the energy density of the battery cell 20.

In some embodiments, the area of the first surface 2221 is $S_1$, and the area of the second surface 2231 is $S_2$, satisfying $S_1/S_2 \geq X_2/X_1$, where $S_1/S_2 \geq X_2/X_1$, that is, the ratio of the area of the first surface 2221 of the first tab 222 to the area of the second surface 2231 of the second tab 223 is set to be larger than or equal to the inverse ratio of the electrical conductivity of the first tab 222 to the electrical conductivity of the second tab 223.

Preferably, $S_1/S_2 = X_2/X_1$.

By setting the ratio of the area of the first surface 2221 of the first tab 222 to the area of the second surface 2231 of the second tab 223 to be larger than or equal to the inverse ratio of the electrical conductivity of the first tab 222 to the electrical conductivity of the second tab 223, the area of the first surface 2221 of the first tab 222 with smaller electrical conductivity connected to the output pole is larger, which is conducive to further achieving the close flow capacity of the first tab 222 and the second tab 223, so as to reduce the phenomenon of excess flow area of the first tab 222 or the second tab 223.

According to some embodiments of the present application, referring to FIG. 6 and FIG. 7, the first surface 2221 is in a sector ring or sector shape.

The center of a circle of the first surface 2221 in the sector ring or sector shape may be located on the central axis of the main body part 221, or may not be located on the central axis of the main body part 221. Exemplarily, in FIG. 7, the first surface 2221 is in a sector ring shape, and the center of a circle of the first surface 2221 in the sector ring shape is located on the central axis of the main body part 221. It should be noted that the sector ring shape is the shape of a portion of a circular ring structure cut off by a sector.

By setting the first surface 2221 of the first tab 222 to be of a structure in the sector ring or sector shape, the space utilization rate of the first tab 222 at one end of the main body part 221 can be increased, and the area of contact between the first tab 222 and the output pole through the first surface 2221 can be increased.

According to some embodiments of the present application, still referring to FIG. 6 and FIG. 7, along the circumferential direction Y of the main body part, two ends of the first tab 222 respectively form a first end face 2222 and a second end face 2223, the first end face 2222 is connected to the first surface 2221 to form a first edge 2224, the second end face 2223 is connected to the first surface 2221 to form a second edge 2225, and the angle between the first edge 2224 and the second edge 2225 is α, satisfying 45°≤α≤270°, where the circumferential direction Y of the main body part is the circumferential direction of the main body part 221.

Two ends of the first tab 222 respectively form the first end face 2222 and the second end face 2223, that is, the end faces of the first tab 222 at the two ends in the circumferential direction Y of the main body part are the first end face 2222 and the second end face 2223 respectively.

The first end face 2222 is connected to the first surface 2221 to form the first edge 2224, and the second end face 2223 is connected to the first surface 2221 to form the second edge 2225. That is, the first edge 2224 and the second edge 2225 are respectively two straight edges of the first surface 2221 in the sector ring or sector shape, and the first edge 2224 and the second edge 2225 are both located on the radius edge of the structure in the sector ring or sector shape.

The angle between the first edge 2224 and the second edge 2225 is α, that is, the central angle of the first surface 2221 in the sector ring or sector shape is α.

By setting the angle formed between the first edge 2224 and the second edge 2225 of the first tab 222 to be larger than or equal to 45 degrees, the central angle of the first surface 2221 of the first tab 222 in the sector ring or sector shape is larger than or equal to 45 degrees, so that the first surface 2221 of the first tab 222 has a sufficient area to contact with the output pole, thereby increasing the flow area between the first tab 222 and the output pole. In addition, by setting the angle formed between the first edge 2224 and the second edge 2225 of the first tab 222 to be smaller than or equal to 270 degrees, the central angle of the first surface 2221 of the first tab 222 in the sector ring or sector shape is smaller than or equal to 270 degrees, so as to alleviate the phenomenon that the first tab 222 and the second tab 223 are easily short-circuited due to too large space occupied by the first tab 222, thereby improving the use reliability of the electrode assembly 22.

In some embodiments, referring to FIG. 6 and FIG. 7, the angle between the first edge 2224 and the second edge 2225 is α, satisfying 90°≤α≤180°.

Exemplarily, in FIG. 7, a is 180 degrees, that is, the first edge 2224 and the second edge 2225 are collinear with each other. Of course, in other embodiments, the angle α between the first edge 2224 and the second edge 2225 may also be 90°, 95°, 100°, 110°, 120°, 130°, 135°, 140°, 150°, 160°, 170° or 175°, etc.

By setting the angle formed between the first edge 2224 and the second edge 2225 of the first tab 222 to be larger than or equal to 90 degrees, the central angle of the first surface 2221 of the first tab 222 in the sector ring or sector shape is larger than or equal to 90 degrees, so that the first surface 2221 of the first tab 222 has a sufficient area to contact with the output pole, thereby being conducive to increasing the flow area between the first tab 222 and the output pole. In addition, by setting the angle formed between the first edge 2224 and the second edge 2225 of the first tab 222 to be smaller than or equal to 180 degrees, the central angle of the first surface 2221 of the first tab 222 in the sector ring or sector shape is smaller than or equal to 180 degrees, which is conducive to alleviating the phenomenon of mutual interference between the first tab 222 and the second tab 223 due to too much space occupied by the first tab 222, thereby reducing the risk of short circuit between the first tab 222 and the second tab 223.

In some embodiments, referring to FIG. 6 and FIG. 7, the first end face 2222 and the second end face 2223 are both parallel to the axial direction X of the main body part. That is, the first end face 2222 and the second end face 2223 are both of structures perpendicular to the first surface 2221, so that the first tab 222 as a whole is in the sector ring or sector shape.

By setting the first end face 2222 and the second end face 2223 of the first tab 222 to be parallel to the axial direction X of the main body part, the first tab 222 as a whole is of a structure in the sector ring or sector shape, thereby reducing the processing difficulty of the first tab 222, and facilitating the assembly and connection between the first tab 222 and the output pole.

In some embodiments, referring to FIG. 7, the plane where the first end face 2222 is located intersects with the plane where the second end face 2223 is located at the central axis of the main body part 221. That is, the straight line where the plane where the first end face 2222 is located intersects with the plane where the second end face 2223 is located is collinear with the central axis of the main body part 221. In other words, the intersection of the first edge 2224 and the second edge 2225 is located on the central axis of the main body part 221, so that the center of a circle of the first surface 2221 in the sector ring or sector shape is located on the central axis of the main body part 221.

By enabling the plane where the first end face 2222 is located to intersect with the plane where the second end face 2223 is located at the central axis of the main body part 221, the straight line where the plane where the first end face 2222 is located intersects with the plane where the second end face 2223 is located is collinear with the central axis of the main body part 221, so that the first surface 2221 is of a structure in the sector ring or sector shape with the center of a circle on the central axis of the main body part 221. Therefore, on the one hand, it is easy to process the first tab 222 and conducive to reducing the processing difficulty of the first tab 222; and on the other hand, the space utilization rate of the first tab 222 at one end of the main body part 221 can be further increased.

Figure 8:
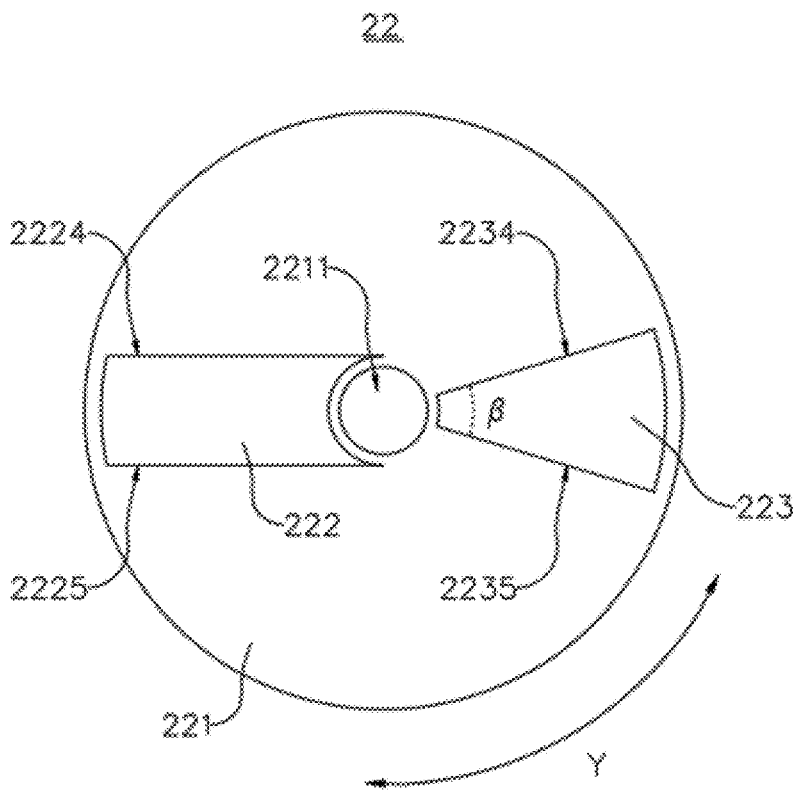
FIG. 8 is a top view of an electrode assembly according to some other embodiments of the present application.

According to some embodiments of the present application, referring to FIG. 8, FIG. 8 is a top view of an electrode assembly 22 according to some other embodiments of the present application. Along the circumferential direction Y of the main body part, two ends of the first tab 222 respectively form a first end face 2222 and a second end face 2223, the first end face 2222 and the second end face 2223 are arranged opposite to each other, the first end face 2222 is connected to the first surface 2221 to form a first edge 2224, the second end face 2223 is connected to the first surface 2221 to form a second edge 2225, and the first edge 2224 is parallel to the second edge 2225.

The first end face 2222 and the second end face 2223 are arranged opposite to each other, that is, the first end face 2222 and the second end face 2223 are arranged facing each other.

The first edge 2224 is parallel to the second edge 2225, that is, an intersection line between the first surface 2221 and the first end face 2222 and an intersection line between the first surface 2221 and the second end face 2223 are parallel to each other.

The first end face 2222 and the second end face 2223 at two ends of the first tab 222 are arranged opposite to each other in the circumferential direction Y of the main body part, and the first edge 2224 formed by the first end face 2222 connected to the first surface 2221 and the second edge 2225 formed by the second end face 2223 connected to the first surface 2221 are parallel to each other, so that the two ends of the first tab 222 in the circumferential direction Y of the main body part are flush with each other. Therefore, the first surface 2221 of the first tab 222 has a constant width in the radial direction of the main body part 221, thereby being easier to implement the processing technology of the first tab 222, and conducive to reducing the processing difficulty of the first tab 222.

In some embodiments, referring to FIG. 8, the first end face 2222 and the second end face 2223 are both parallel to the axial direction X of the main body part. That is, both the first end face 2222 and the second end face 2223 are of structures perpendicular to the first surface 2221, so that the overall shape of the first tab 222 is the same as the shape of the first surface 2221.

By setting the first end face 2222 and the second end face 2223 of the first tab 222 to be parallel to the axial direction X of the main body part, the first tab 222 as a whole has a constant width in the radial direction of the main body part 221, thereby reducing the processing difficulty of the first tab 222.

According to some embodiments of the present application, referring to FIG. 6 and FIG. 7, the second surface 2231 is in a sector ring or sector shape.

The center of a circle of the second surface 2231 in the sector ring or sector shape may be located on the central axis of the main body part 221, or may not be located on the central axis of the main body part 221. Exemplarily, in FIG. 7, the second surface 2231 is in a sector ring shape, and the center of a circle of the second surface 2231 in the sector ring shape is located on the central axis of the main body part 221. It should be noted that the sector ring shape is the shape of a portion of a circular ring structure cut off by a sector.

It should be noted that in the embodiment where the second surface 2231 of the second tab 223 is in the sector ring or sector shape, the first surface 2221 of the first tab 222 may be in the sector ring or sector shape (as shown in FIG. 7), and the first surface 2221 of the first tab 222 may also be of a structure where the first edge 2224 and the second edge 2225 are parallel to each other (as shown in FIG. 8).

By setting the second surface 2231 of the second tab 223 to be of a structure in the sector ring or sector shape, the space utilization rate of the second tab 223 at one end of the main body part 221 can be increased, and the area of contact between the second tab 223 and the output pole through the second surface 2231 can be increased.

According to some embodiments of the present application, still referring to FIG. 6 and FIG. 7, along the circumferential direction Y of the main body part, two ends of the second tab 223 respectively form a third end face 2232 and a fourth end face 2233, the third end face 2232 is connected to the second surface 2231 to form a third edge 2234, the fourth end face 2233 is connected to the second surface 2231 to form a fourth edge 2235, and the angle between the third edge 2234 and the fourth edge 2235 is β, satisfying 45°≤β≤270°.

Two ends of the second tab 223 respectively form the third end face 2232 and the fourth end face 2233, that is, the end faces of the second tab 223 at the two ends in the circumferential direction Y of the main body part are the third end face 2232 and the fourth end face 2233 respectively.

The third end face 2232 is connected to the second surface 2231 to form the third edge 2234, and the fourth end face 2233 is connected to the second surface 2231 to form the fourth edge 2235. That is, the third edge 2234 and the fourth edge 2235 are respectively two straight edges of the second surface 2231 in the sector shape, and the third edge 2234 and the fourth edge 2235 are located on the radius edge of the structure in the sector ring or sector shape.

The angle between the third edge 2234 and the fourth edge 2235 is α, that is, the central angle of the second surface 2231 in the sector ring or sector shape is β.

By setting the angle formed between the third edge 2234 and the fourth edge 2235 of the second tab 223 to be larger than or equal to 45 degrees, the central angle of the second surface 2231 of the second tab 223 in the sector ring or sector shape is larger than or equal to 45 degrees, so that the second surface 2231 of the second tab 223 has a sufficient area to contact with the output pole, thereby increasing the flow area between the second tab 223 and the output pole. In addition, by setting the angle formed between the third edge 2234 and the fourth edge 2235 of the second tab 223 to be smaller than or equal to 270 degrees, the central angle of the second surface 2231 of the second tab 223 in the sector ring or sector shape is smaller than or equal to 270 degrees, so as to alleviate the phenomenon that the second tab 223 and the first tab 222 are easily short-circuited due to too large space occupied by the second tab 223, thereby improving the use reliability of the electrode assembly 22.

In some embodiments, referring to FIG. 6 and FIG. 7, the angle between the third edge 2234 and the fourth edge 2235 is β, satisfying 90°≤β≤120°.

Exemplarily, in FIG. 7, β is 120 degrees, that is, the included angle between the third edge 2234 and the fourth edge 2235 is 120 degrees. Of course, in other embodiments, the angle β between the third edge 2234 and the fourth edge 2235 may also be 90°, 95°, 100°, 105°, 110° or 115°, etc.

By setting the angle formed between the third edge 2234 and the fourth edge 2235 of the second tab 223 to be larger than or equal to 90 degrees, the central angle of the second surface 2231 of the second tab 223 in the sector ring or sector shape is larger than or equal to 90 degrees, so that the second surface 2231 of the second tab 223 has a sufficient area to contact with the output pole, thereby being conducive to increasing the flow area between the second tab 223 and the output pole. In addition, by setting the angle formed between the third edge 2234 and the fourth edge 2235 of the second tab 223 to be smaller than or equal to 120 degrees, the central angle of the second surface 2231 of the second tab 223 in the sector ring or sector shape is smaller than or equal to 120 degrees, which is conducive to alleviating the phenomenon of mutual interference between the second tab 223 and the first tab 222 due to too much space occupied by the second tab 223, thereby reducing the risk of short circuit between the second tab 223 and the first tab 222.

In some embodiments, referring to FIG. 6 and FIG. 7, the third end face 2232 and the fourth end face 2233 are both parallel to the axial direction X of the main body part. That is, the third end face 2232 and the fourth end face 2233 are both of structures perpendicular to the second surface 2231, so that the second tab 223 as a whole is in the sector ring or sector shape.

By setting the third end face 2232 and the fourth end face 2233 of the second tab 223 to be parallel to the axial direction X of the main body part, the second tab 223 as a whole is of a structure in the sector ring or sector shape, thereby reducing the processing difficulty of the second tab 223, and facilitating the assembly and connection between the second tab 223 and the output pole.

In some embodiments, referring to FIG. 7, the plane where the third end face 2232 is located intersects with the plane where the fourth end face 2233 is located at the central axis of the main body part 221. That is, the straight line where the plane where the third end face 2232 is located intersects with the plane where the fourth end face 2233 is located is collinear with the central axis of the main body part 221. In other words, the intersection of the third edge 2234 and the fourth edge 2235 is located on the central axis of the main body part 221, so that the center of a circle of the second surface 2231 in the sector ring or sector shape is located on the central axis of the main body part 221.

By enabling the plane where the third end face 2232 is located to intersect with the plane where the fourth end face 2233 is located at the central axis of the main body part 221, the straight line where the plane where the third end face 2232 is located intersects with the plane where the fourth end face 2233 is located is collinear with the central axis of the main body part 221, so that the second surface 2231 is of a structure in the sector ring or sector shape with the center of a circle on the central axis of the main body part 221. Therefore, on the one hand, it is easy to process the second tab 223 and conducive to reducing the processing difficulty of the second tab 223; and on the other hand, the space utilization rate of the second tab 223 at one end of the main body part 221 can be further increased.

Figure 9:
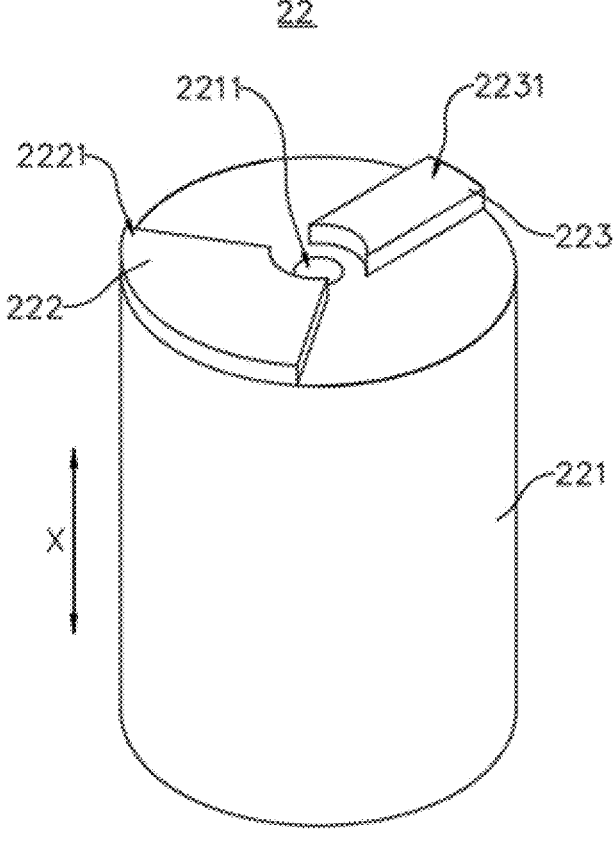
FIG. 9 is a schematic structural view of an electrode assembly according to still some embodiments of the present application.
Figure 10:
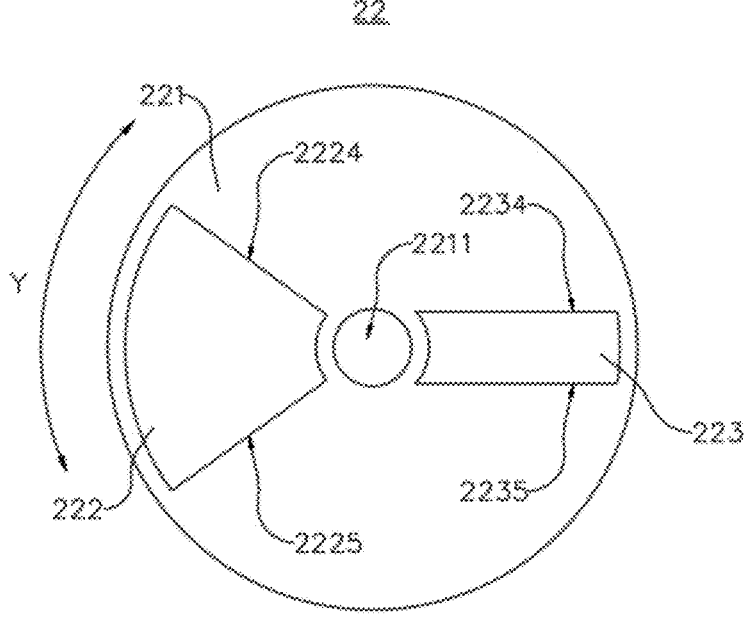
FIG. 10 is a top view of an electrode assembly according to further some embodiments of the present application.

According to some embodiments of the present application, referring to FIG. 9 and FIG. 10, FIG. 9 is a schematic structural view of an electrode assembly 22 according to still some embodiments of the present application, and FIG. 10 is a top view of an electrode assembly 22 according to further some embodiments of the present application. Along the circumferential direction Y of the main body part, two ends of the second tab 223 respectively form a third end face 2232 and a fourth end face 2233, the third end face 2232 and the fourth end face 2233 are arranged opposite to each other, the third end face 2232 is connected to the second surface 2231 to form a third edge 2234, the fourth end face 2233 is connected to the second surface 2231 to form a fourth edge 2235, and the third edge 2234 is parallel to the fourth edge 2235.

The third end face 2232 and the fourth end face 2233 are arranged opposite to each other, that is, the first end face 2222 and the second end face 2223 are arranged facing each other.

The third edge 2234 is parallel to the fourth edge 2235, that is, an intersection line between the second surface 2231 and the third end face 2232 and an intersection line between the second surface 2231 and the fourth end face 2233 are parallel to each other.

It should be noted that in FIG. 10, in an embodiment where the third edge 2234 and the fourth edge 2235 of the second surface 2231 are parallel to each other, the first surface 2221 of the first tab 222 is in the sector ring or sector shape. Of course, in other embodiments, in an embodiment where the third edge 2234 and the fourth edge 2235 of the second surface 2231 are parallel to each other, the first surface 2221 of the first tab 222 may also be of a structure in which the first edge 2224 and the second edge 2225 are parallel to each other.

The third end face 2232 and the fourth end face 2233 at two ends of the second tab 223 are arranged opposite to each other in the circumferential direction Y of the main body part, and the third edge 2234 formed by the third end face 2232 connected to the second surface 2231 and the fourth edge 2235 formed by the fourth end face 2233 connected to the second surface 2231 are parallel to each other, so that the two ends of the second tab 223 in the circumferential direction Y of the main body part are flush with each other. Therefore, the second surface 2231 of the second tab 223 has a constant width in the radial direction of the main body part 221, thereby being easier to implement the processing technology of the second tab 223, and conducive to reducing the processing difficulty of the second tab 223.

In some embodiments, referring to FIG. 9 and FIG. 10, the third end face 2232 and the fourth end face 2233 are both parallel to the axial direction X of the main body part. That is, both the third end face 2232 and the fourth end face 2233 are of structures perpendicular to the second surface 2231, so that the overall shape of the second tab 223 is the same as the shape of the second surface 2231.

By setting the third end face 2232 and the fourth end face 2233 of the second tab to be parallel to the axial direction X of the main body part, the second tab 223 as a whole has a constant width in the radial direction of the main body part 221, thereby reducing the processing difficulty of the second tab 223.

According to some embodiments of the present application, referring to FIG. 5, FIG. 6 and FIG. 7, along the radial direction of the main body part 221, the first tab 222 and the outer peripheral surface of the main body part 221 are arranged at an interval.

The radial direction of the main body part 221 is in a plane perpendicular to the axial direction X of the main body part, and the central axis of the main body part 221 points to the outer peripheral surface of the main body part 221 or the outer peripheral surface of the main body part 221 points to the direction of the central axis of the main body part 221.

The first tab 222 and the outer peripheral surface of the main body part 221 are arranged at an interval, that is, there is a gap between the first tab 222 and the outer peripheral surface of the main body part 221 in the radial direction of the main body part 221. In other words, if the first tab 222 is a positive tab, the first tab 222 is not arranged on the outermost N turns of the positive electrode plate of the electrode assembly 22 having a wound structure, where N may be one, two, three or four, etc.; and if the first tab 222 is a negative tab, the first tab 222 is not arranged on the outermost N turns of the negative electrode plate of the electrode assembly 22 having a wound structure, where N may be one, two, three or four, etc.

In some embodiments, along the radial direction of the main body part 221, the second tab 223 and the outer peripheral surface of the main body part 221 are arranged at an interval, that is, there is a gap between the second tab 223 and the outer peripheral surface of the main body part 221 in the radial direction of the main body part 221. In other words, if the second tab 223 is a positive tab, the second tab 223 is not arranged on the outermost M turns of the positive electrode plate of the electrode assembly 22 having a wound structure, where M may be one, two, three or four, etc.; and if the second tab 223 is a negative tab, the second tab 223 is not arranged on the outermost M turns of the negative electrode plate of the electrode assembly 22 having a wound structure, where M may be one, two, three or four, etc.

By arranging the first tab 222 and the outer peripheral surface of the main body part 221 at an interval in the radial direction of the main body part 221, the risk of short circuit between the first tab 222 and the shell 21 can be reduced when the electrode assembly 22 is assembled into the shell 21 of the battery cell 20, thereby being conducive to improving the use reliability of the battery cell 20 having such an electrode assembly 22. Similarly, by arranging the second tab 223 and the outer peripheral surface of the main body part 221 at an interval in the radial direction of the main body part 221, the risk of short circuit between the second tab 223 and the shell 21 can be reduced when the electrode assembly 22 is assembled into the shell 21 of the battery cell 20, thereby being conducive to improving the use reliability of the battery cell 20 having such an electrode assembly 22.

In some embodiments, still referring to FIG. 5, FIG. 6 and FIG. 7, the electrode assembly 22 is a wound electrode assembly 22, the main body part 221 has a central through hole 2211, and the central through hole 2211 passes through the main body part 221 along the axial direction X of the main body part. Along the radial direction of the main body part 221, the first tab 222 and the hole wall face of the central through hole 2211 are arranged at an interval.

The central through hole 2211 is a central channel formed by winding the positive electrode plate, the negative electrode plate and the spacer of the main body part 221 of the electrode assembly 22 together.

The first tab 222 and the hole wall face of the central through hole 2211 are arranged at an interval, that is, there is a gap between the first tab 222 and the hole wall face of the central through hole 2211 in the radial direction of the main body part 221. In other words, if the first tab 222 is a positive tab, the first tab 222 is not arranged on the innermost P turns of the positive electrode plate of the electrode assembly 22 having a wound structure, where P may be one, two, three or four, etc.; and if the first tab 222 is a negative tab, the first tab 222 is not arranged on the innermost P turns of the negative electrode plate of the electrode assembly 22 having a wound structure, where P may be one, two, three or four, etc.

In some embodiments, along the radial direction of the main body part 221, the second tab 223 and the hole wall face of the central through hole 2211 are arranged at an interval, that is, there is a gap between the second tab 223 and the hole wall face of the central through hole 2211 in the radial direction of the main body part 221. In other words, if the second tab 223 is a positive tab, the second tab 223 is not arranged on the innermost Q turns of the positive electrode plate of the electrode assembly 22 having a wound structure, where Q may be one, two, three or four, etc.; and if the second tab 223 is a negative tab, the second tab 223 is not arranged on the innermost Q turns of the negative electrode plate of the electrode assembly 22 having a wound structure, where Q may be one, two, three or four, etc.

By arranging the first tab 222 and the hole wall face of the central through hole 2211 at an interval in the radial direction of the main body part 221, the risk of short circuit between the first tab 222 and the second tab 223 can be reduced, thereby being conducive to improving the use reliability of the electrode assembly 22. Similarly, by arranging the second tab 223 and the hole wall face of the central through hole 2211 at an interval in the radial direction of the main body part 221, the risk of short circuit between the second tab 223 and the first tab 222 can be reduced, thereby being conducive to improving the use reliability of the electrode assembly 22.

According to some embodiments of the present application, referring to FIG. 3, FIG. 4 and FIG. 5, the present application further provides a battery cell 20. The battery cell 20 includes a shell 21 and an electrode assembly 22 according to any one of the above solutions. The electrode assembly 22 is accommodated in the shell 21.

The shell 21 may include a case 211 and an end cover 212. An accommodating cavity is formed inside the case 211, the accommodating cavity is configured to accommodate the electrode assembly 22, and the accommodating cavity has an opening 2111. In other words, the case 211 is of a hollow structure having the opening 2111 at one end, and the end cover 212 covers the opening 2111 of the case 211 and forms a sealed connection to form a sealed space for accommodating the electrode assembly 22 and the electrolyte.

Exemplarily, the shell 21 is cylindrical, and the central axis of the shell 21 extends along the axial direction X of the main body part.

For the battery cell 20 having such a structure, by setting the area of the first surface 2221 of the first tab 222 away from the main body part 221 in the axial direction X of the main body part to be larger than the area of the second surface 2231 of the second tab 223 away from the main body part 221 in the axial direction X of the main body part, the areas of regions of the first tab 222 and the second tab 223 configured to be connected to the output pole of the battery cell 20 are different, so that during the assembly of the battery cell 20, it is convenient to distinguish and identify the first tab 222 and the second tab 223 with different polarities, and the first tab 222 and the second tab 223 can be assembled with the corresponding output poles respectively without secondary positioning of the electrode assembly 22 when the electrode assembly 22 is assembled into the shell 21, thereby being conducive to reducing the assembly difficulty of the battery cell 20 to improve the assembly efficiency of the battery cell 20.

According to some embodiments of the present application, still referring to FIG. 3, FIG. 4 and FIG. 5, the shell 21 has a wall portion 213, the battery cell 20 further includes an electrode terminal 23, and the electrode terminal 23 is mounted on the wall portion 213 in an insulated manner. Along the axial direction X of the main body part, the first tab 222 and the second tab 223 are both arranged at one end of the main body part 221 facing the wall portion 213, the first surface 2221 is configured to be electrically connected to the wall portion 213, and the second surface 2231 is configured to be electrically connected to the electrode terminal 23.

The electrode terminal 23 is configured to be electrically connected to the second surface 2231 of the second tab 223 of the electrode assembly 22, so that the electrode terminal 23 can output or input electric energy of the battery cell 20. The electrode terminal 23 may be made of various materials, such as copper, iron, aluminum, steel or aluminum alloy.

The electrode terminal 23 is mounted on the wall portion 213 in an insulated manner, that is, no electrical connection is formed between the electrode terminal 23 and the wall portion 213. In some embodiments, referring to FIG. 5, an assembling hole 2113a is provided on the wall portion 213, the assembling hole 2113a passes through two sides of the wall portion 213 along the thickness direction of the wall portion 213, the electrode terminal 23 is penetrated in the assembling hole 2113a, and two ends of the electrode terminal 23 in the thickness direction of the wall portion 213 respectively extend out of the assembling hole 2113a, so that the two ends of the electrode terminal 23 in the thickness direction of the wall portion 213 respectively protrude from the two sides of the wall portion 213. Therefore, one end of the electrode terminal 23 facing the electrode assembly 22 in the thickness direction of the wall portion 213 can be electrically connected to the second surface 2231 of the second tab 223, and the other end can be electrically connected to the convergence component of the battery 100.

The battery cell 20 further includes a second insulating member 24, and the second insulating member 24 is arranged between the wall portion 213 and the electrode terminal 23 to isolate the wall portion 213 from the electrode terminal 23 in an insulated manner, thereby achieving insulated mounting of the electrode terminal 23 on the wall portion 213.

Exemplarily, the second insulating member 24 may be made of rubber, plastic or silicone, etc.

It should be noted that the wall portion 213 for mounting the electrode terminal 23 may be the end cover 212 of the shell 21, or may be the bottom wall 2113 of the case 211 of the shell 21. Exemplarily, in FIG. 4, the wall portion 213 is the end cover 212 of the shell 21.

In some embodiments, the battery cell 20 may further include a pressure relief component 25, the pressure relief component 25 is arranged on the shell 21, and the pressure relief component 25 is configured to relieve the pressure inside the battery cell 20 when the internal pressure or temperature of the battery cell 20 reaches a predetermined value. Optionally, the pressure relief component 25 may be arranged on the end cover 212 of the shell 21, or may be arranged on the case 211 of the shell 21.

Exemplarily, in FIG. 4, the pressure relief component 25 is arranged on the bottom wall 2113 of the case 211. Similarly, the pressure relief component 25 and the shell 21 may be of an integrally formed structure or split structures. Exemplarily, in FIG. 4, the pressure relief component 25 and the bottom wall 2113 of the case 211 are of an integrally formed structure, and the pressure relief component 25 is a region where a weak structure is formed on the bottom wall 2113, for example, the pressure relief component 25 is a region where a score groove is provided on the bottom wall 2113. Of course, in other embodiments, the pressure relief component 25 and the bottom wall 2113 may also be of split structures, and the pressure relief component 25 may be connected to the bottom wall 2113 by means of welding and the like. Correspondingly, the pressure relief component 25 may be a component such as an explosion-proof valve, a rupture disk, an air valve, a pressure relief valve or a safety valve.

The first surface 2221 is configured to be electrically connected to the wall portion 213, that is, the first tab 222 is electrically connected to the wall portion 213 through the first surface 2221 to achieve the function of electrical connection between the first tab 222 and the wall portion 213, where the first surface 2221 may be directly connected to the wall portion 213 to achieve electrical connection between the first tab 222 and the wall portion 213, or the first surface 2221 may be first connected to other components and then connected to the wall portion 213 to achieve indirect electrical connection between the first tab 222 and the wall portion 213.

The second surface 2231 is configured to be electrically connected to the electrode terminal 23, that is, the second tab 223 is electrically connected to the electrode terminal 23 through the second surface 2231 to achieve the function of electrical connection between the second tab 223 and the electrode terminal 23, where the second surface 2231 may be directly connected to the electrode terminal 23 to achieve electrical connection between the second tab 223 and the electrode terminal 23, or the second surface 2231 may be first connected to other components and then connected to the electrode terminal 23 to achieve indirect electrical connection between the second tab 223 and the electrode terminal 23.

The first tab 222 and the second tab 223 are both arranged at one end of the main body part 221 facing the wall portion 213, the first surface 2221 of the first tab 222 is configured to be electrically connected to the wall portion 213, and the second surface 2231 of the second tab 223 is configured to be electrically connected to the electrode terminal 23, so that the input or output of the electric energy of the first tab 222 and the second tab 223 of the electrode assembly 22 can be achieved, the structure is simple, and the assembly is facilitated.

According to some embodiments of the present application, referring to FIG. 5 and FIG. 6, the electrode terminal 23 protrudes from a side of the wall portion 213 facing the electrode assembly 22. Along the axial direction X of the main body part, the first surface 2221 is closer to the wall portion 213 than the second surface 2231.

The first surface 2221 is closer to the wall portion 213 than the second surface 2231, that is, in the axial direction X of the main body part, the height of the first tab 222 protruding from the main body part 221 is greater than the height of the second tab 223 protruding from the main body part 221, so that the first tab 222 is higher than the second tab 223. That is, in the axial direction X of the main body part, the first surface 2221 and the second surface 2231 are arranged at an interval, and the first surface 2221 is closer to the wall portion 213 than the second surface 2231, so that the first surface 2221 and the wall portion 213 are electrically connected.

The electrode terminal 23 is configured to protrude from the side of the wall portion 213 facing the electrode assembly 22 so as to facilitate the electrical connection between the electrode terminal 23 and the second tab 223, where the first surface 2221 of the first tab 222 is configured to be closer to the wall portion 213 than the second surface 2231 of the second tab 223, so that the height of the first tab 222 protruding from the main body part 221 is greater than the height of the second tab 223 protruding from the main body part 221, and then, the first tab 222 can compensate for the distance difference between the wall portion 213 and the electrode terminal 23, thereby reducing the difficulty of electrical connection between the first tab 222 and the wall portion 213, and improving the effect of electrical connection between the first tab 222 and the wall portion 213.

In some embodiments, referring to FIG. 4 and FIG. 5, the battery cell 20 may further include a first current collecting member 26 and a second current collecting member 27. The first current collecting member 26 is arranged between the wall portion 213 and the first surface 2221, and the first current collecting member 26 connects the wall portion 213 and the first surface 2221 to electrically connect the first tab 222 and the wall portion 213. The second current collecting member 27 is arranged between the electrode terminal 23 and the second surface 2231, the second current collecting member 27 and the first current collecting member 26 are arranged at an interval, and the second current collecting member 27 connects the electrode terminal 23 and the second surface 2231 to electrically connect the second tab 223 and the electrode terminal 23.

Along the axial direction X of the main body part, the first current collecting member 26 is arranged between the wall portion 213 and the first tab 222, and two sides of the first current collecting member 26 are respectively connected to the wall portion 213 and the first surface 2221 of the first tab 222 to achieve electrical connection between the first tab 222 and the wall portion 213.

Optionally, the connection structure between the first current collecting member 26 and the first surface 2221 of the first tab 222 may be in various forms, such as welding, abutting or clamping. Similarly, the connection structure between the first current collecting member 26 and the wall portion 213 may be in various forms, such as welding, abutting or clamping.

The first current collecting member 26 serves to electrically connect the first tab 222 and the wall portion 213. The first current collecting member 26 may be made of various materials. For example, the first current collecting member 26 may be made of copper, iron, aluminum, steel or aluminum alloy.

Similarly, along the axial direction X of the main body part, the second current collecting member 27 is arranged between the electrode terminal 23 and the second tab 223, and two sides of the second current collecting member 27 are respectively connected to the electrode terminal 23 and the second surface 2231 of the second tab 223 to achieve electrical connection between the second tab 223 and the electrode terminal 23.

Optionally, the connection structure between the second current collecting member 27 and the second surface 2231 of the second tab 223 may be in various forms, such as welding, abutting or clamping. Similarly, the connection structure between the second current collecting member 27 and the electrode terminal 23 may be in various forms, such as welding, abutting or clamping.

The second current collecting member 27 serves to electrically connect the second tab 223 and the electrode terminal 23. The second current collecting member 27 may be made of various materials. For example, the second current collecting member 27 may be made of copper, iron, aluminum, steel or aluminum alloy.

Exemplarily, in FIG. 5, the first current collecting member 26 and the second current collecting member 27 have the same thickness in the axial direction X of the main body part, and the height of the first tab 222 protruding from the second tab 223 is equal to the height of the electrode terminal 23 protruding from the side of the wall portion 213 facing the electrode assembly 22, thereby facilitating the connection between the first tab 222 and the wall portion 213 through the first current collecting member 26, and facilitating the connection between the second tab 223 and the electrode terminal 23 through the second current collecting member 27.

The first current collecting member 26 is arranged between the wall portion 213 and the first surface 2221 of the first tab 222, and the first current collecting member 26 connects the wall portion 213 and the first surface 2221 of the first tab 222 to achieve electrical connection between the first tab 222 and the wall portion 213, thereby being conducive to reducing the difficulty of electrical connection between the first surface 2221 of the first tab 222 and the wall portion 213. Similarly, the second current collecting member 27 is arranged between the electrode terminal 23 and the second surface 2231 of the second tab 223, and the second current collecting member 27 connects the electrode terminal 23 and the second surface 2231 of the second tab 223 to achieve electrical connection between the second tab 223 and the electrode terminal 23, thereby being conducive to reducing the difficulty of electrical connection between the second tab 223 and the electrode terminal 23. In addition, the first current collecting member 26 and the second current collecting member 27 are arranged at an interval to reduce the phenomenon of short circuit between the first current collecting member 26 and the second current collecting member 27, thereby being conducive to reducing the use risk of the battery cell 20.

Figure 11:
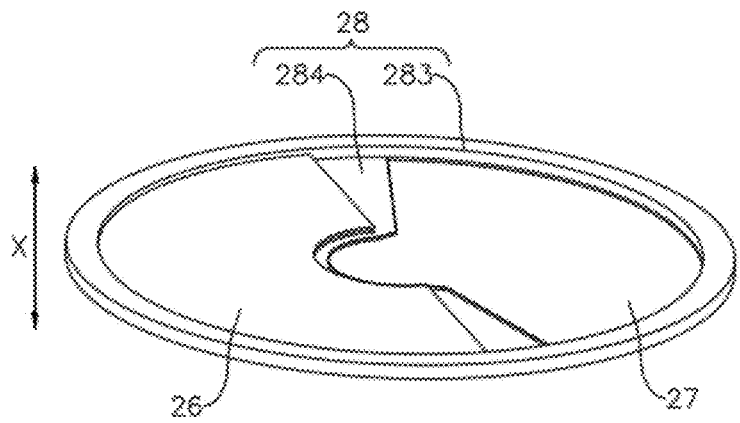
FIG. 11 is a schematic view of connection of a first current collecting member and a second current collecting member of a battery cell according to some embodiments of the present application assembled on a first insulating member.
Figure 12:
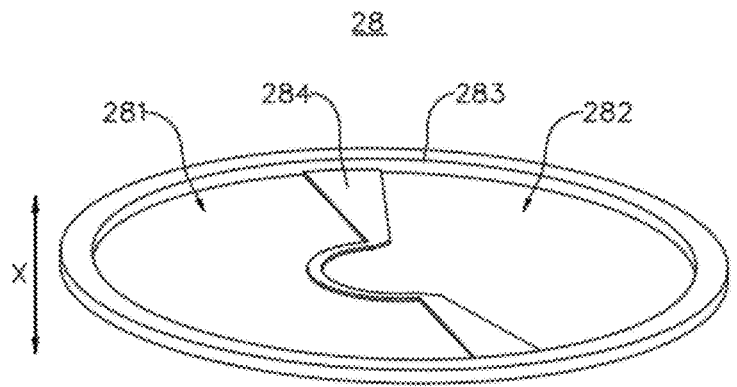
FIG. 12 is a schematic structural view of a first insulating member of a battery cell according to some embodiments of the present application.

According to some embodiments of the present application, referring to FIG. 4 and FIG. 5 and further referring to FIG. 11 and FIG. 12, FIG. 11 is a schematic view of connection of a first current collecting member 26 and a second current collecting member 27 of a battery cell 20 according to some embodiments of the present application assembled on a first insulating member 28, and FIG. 12 is a schematic structural view of a first insulating member 28 of a battery cell 20 according to some embodiments of the present application. The battery cell 20 may further include a first insulating member 28, the first insulating member 28 is arranged between the electrode assembly 22 and the wall portion 213, and the first insulating member 28 isolates the first current collecting member 26 from the second current collecting member 27 in an insulated manner.

The first insulating member 28 provides insulated isolation for the first current collecting member 26 and the second current collecting member 27. The first insulating member 28 may be made of rubber, silicone or plastic, etc.

The first insulating member 28 isolates the first current collecting member 26 from the second current collecting member 27 in an insulated manner. In other words, at least a portion of the first insulating member 28 is located between the first current collecting member 26 and the second current collecting member 27 so that the first current collecting member 26 and the second current collecting member 27 do not contact each other, that is, the first insulating member 28 can separate the first current collecting member 26 from the second current collecting member 27.

The first insulating member 28 is arranged between the electrode assembly 22 and the wall portion 213, and the first insulating member 28 is configured to isolate the first current collecting member 26 from the second current collecting member 27 in an insulated manner, so as to achieve insulated isolation between the first current collecting member 26 and the second current collecting member 27, thereby being conducive to further reducing the risk of short circuit between the first current collecting member 26 and the second current collecting member 27.

In some embodiments, still referring to FIG. 4, FIG. 5, FIG. 11 and FIG. 12, the first insulating member 28 is provided with a first mounting hole 281 and a second mounting hole 282 arranged at an interval, the first current collecting member 26 is arranged in the first mounting hole 281, and the second current collecting member 27 is arranged in the second mounting hole 282.

The first insulating member 28 is provided with the first mounting hole 281 and the second mounting hole 282 arranged at an interval, that is, the first mounting hole 281 and the second mounting hole 282 arranged on the first insulating member 28 do not contact each other, so that the first insulating member 28 can also provide an assembling function for the first current collecting member 26 and the second current collecting member 27. Referring to FIG. 12, both the first mounting hole 281 and the second mounting hole 282 are of structures passing through two sides of the first insulating member 28 in the axial direction X of the main body part.

Exemplarily, the first current collecting member 26 is clamped into the first mounting hole 281. Of course, in other embodiments, the first current collecting member 26 may also be connected into the first mounting hole 281 by bonding or bolting. Similarly, the second current collecting member 27 is clamped into the second mounting hole 282. Of course, in other embodiments, the second current collecting member 27 may also be connected into the second mounting hole 282 by bonding or bolting.

By providing the first mounting hole 281 and the second mounting hole 282 arranged at an interval on the first insulating member 28 and arranging the first current collecting member 26 and the second current collecting member 27 in the first mounting hole 281 and the second mounting hole 282 respectively, on the one hand, the first current collecting member 26 and the second current collecting member 27 can be assembled to the first insulating member 28, so that the first insulating member 28 can support and assemble the first current collecting member 26 and the second current collecting member 27, thereby being conducive to reducing the difficulty of arranging the first current collecting member 26 and the second current collecting member 27 between the wall portion 213 and the electrode assembly 22; and on the other hand, the first current collecting member 26 and the second current collecting member 27 can be arranged at an interval on the first insulating member 28 to achieve insulated isolation between the first current collecting member 26 and the second current collecting member 27.

In some embodiments, referring to FIG. 11 and FIG. 12, the first insulating member 28 may include a first insulator 283 and a second insulator 284. The first insulator 283 is of a ring structure, the second insulator 284 is connected to the first insulator 283, the second insulator 284 is configured to separate the internal space of the first insulator 283 into the first mounting hole 281 and the second mounting hole 282, and the second insulator 284 is located between the first current collecting member 26 and the second current collecting member 27.

The first insulator 283 is of a ring structure, that is, the first insulator 283 is of a ring structure connected end to end. The shape of the first insulator 283 may be various. Exemplarily, referring to FIG. 11 and FIG. 12, the first insulator 283 is of a circular ring structure, and the first insulator 283 surrounds the outside of the first current collecting member 26 and the second current collecting member 27, that is, the first insulator 283 is of a ring structure, and the first current collecting member 26 and the second current collecting member 27 are both located on the inner side of the first insulator 283.

The second insulator 284 is connected to the first insulator 283, the second insulator 284 is configured to separate the internal space of the first insulator 283 into the first mounting hole 281 and the second mounting hole 282, and the second insulator 284 is located between the first current collecting member 26 and the second current collecting member 27. That is, the second insulator 284 is located on the inner side of the first insulator 283, and both ends of the second insulator 284 are connected to the inner peripheral surface of the first insulator 283 to separate the internal space of the first insulator 283 into two assembling spaces, namely the first mounting hole 281 and the second mounting hole 282.

Optionally, the first insulator 283 and the second insulator 284 may be of an integrally formed structure or split structures. Exemplarily, in FIG. 12, the first insulator 283 and the second insulator 284 are of an integrally formed structure, and the first insulator 283 and the second insulator 284 may be made by an integral forming process such as injection molding, stamping or extrusion molding.

The first insulating member 28 is provided with the first insulator 283 having the ring structure and the second insulator 284 connected to the inner side of the first insulator 283, and the second insulator 284 is configured to separate the internal space of the first insulator 283 into the first mounting hole 281 and the second mounting hole 282, so that the first insulator 283 and the second insulator 284 together define the first mounting hole 281 and the second mounting hole 282 for assembling the first current collecting member 26 and the second current collecting member 27. On the one hand, the first insulating member 28 having such a structure can surround the outside of the first current collecting member 26 and the second current collecting member 27 through the first insulator 283, so that the first current collecting member 26 and the second current collecting member 27 can be separated from the shell 21, thereby being conducive to reducing the risk of short circuit between the first current collecting member 26 and the second current collecting member 27 and the shell 21. On the other hand, the first current collecting member 26 and the second current collecting member 27 can be separated through the second insulator 284, thereby being conducive to reducing the risk of short circuit between the first current collecting member 26 and the second current collecting member 27.

According to some embodiments of the present application, referring to FIG. 3 and FIG. 4, the shell 21 may include a case 211 and an end cover 212. An accommodating cavity having an opening 2111 is formed inside the case 211, and the accommodating cavity is configured to accommodate the electrode assembly 22. The end cover 212 closes the opening 2111, and the end cover 212 is the wall portion 213.

The end cover 212 is the wall portion 213, that is, the electrode terminal 23 is mounted on the end cover 212 in an insulated manner, and the end cover 212 is configured to be electrically connected to the first surface 2221 of the first tab 222.

By configuring the wall portion 213 of the shell 21 as the end cover 212 of the shell 21 for closing the opening 2111 of the case 211, the battery cell 20 having such a structure facilitates the assembly of the electrode terminal 23 on the end cover 212 and can reduce the difficulty of electrically connecting the first tab 222 and the second tab 223 to the end cover 212 and the electrode terminal 23 respectively, thereby being conducive to reducing the manufacturing difficulty of the battery cell 20 to improve the production efficiency of the battery cell 20.

It should be noted that the structure of the battery cell 20 is not limited thereto. In some embodiments, the battery cell 20 may also be of other structures. For example, the shell 21 may include a case 211 and an end cover 212. The case 211 includes a side wall 2112 and a bottom wall 2113. The side wall 2112 is arranged around the bottom wall 2113. Along the axial direction X of the main body part, one end of the side wall 2112 is connected to the bottom wall 2113, the other end is enclosed to form an opening 2111, and the side wall 2112 and the bottom wall 2113 together define an accommodating cavity for accommodating the electrode assembly 22. The end cover 212 closes the opening 2111, and the bottom wall 2113 is the wall portion 213. In other words, the wall portion 213 is the bottom wall 2113 of the case 211 arranged opposite to the end cover 212 in the axial direction X of the main body part, that is, the electrode terminal 23 is mounted on the bottom wall 2113 of the case 211 in an insulated manner, and the bottom wall 2113 of the case 211 is configured to be electrically connected to the first surface 2221 of the first tab 222.

The side wall 2112 and the bottom wall 2113 of the case 211 may be of split structures or an integrated structure. Exemplarily, in FIG. 4, the side wall 2112 and the bottom wall 2113 of the case 211 are of split structures, and the bottom wall 2113 may be connected to the end of the side wall 2112 away from the end cover 212 by welding, bonding or clamping. In the embodiment where the side wall 2112 and the bottom wall 2113 of the case 211 are of an integrated structure, the case 211 may be made by an integral forming process such as stamping, casting or extrusion molding.

By configuring the wall portion 213 of the shell 21 as the bottom wall 2113 of the case 211, the wall portion 213 where the electrode terminal 23 is arranged and used for electrical connection with the first tab 222 can be kept away from the end cover 212, thereby reducing the influence of the stress generated when the end cover 212 and the case 211 are connected to each other on the wall portion 213 or the electrode terminal 23 arranged on the wall portion 213, and being conducive to improving the use reliability and prolonging the service life of the battery cell 20.

According to some embodiments of the present application, the present application further provides a battery 100, and the battery 100 includes the battery cell 20 according to any one of the above solutions.

Referring to FIG. 2, the battery 100 may further include a box body 10, and the battery cell 20 is accommodated in the box body 10.

In some embodiments, the box body 10 may include a first box body 11 and a second box body 12. The first box body 11 and the second box body 12 cover each other, and the first box body 11 and the second box body 12 together define an assembling space for accommodating the battery cell 20.

Optionally, the second box body 12 may be of a hollow structure with an open end, the first box body 11 may be of a plate-like structure, and the first box body 11 covers the open side of the second box body 12, so that the first box body 11 and the second box body 12 together define the assembling space. Both the first box body 11 and the second box body 12 may also be of a hollow structure with an open side, and the open side of the first box body 11 covers the open side of the second box body 12.

Of course, the box body 10 formed by the first box body 11 and the second box body 12 may be in various shapes, such as a cylinder or a cuboid. Exemplarily, in FIG. 2, the box body 10 is of a cuboid structure.

Optionally, one battery cell 20 or a plurality of battery cells 20 may be arranged in the box body 10. Exemplarily, in FIG. 2, a plurality of battery cells 20 are arranged in the box body 10 of the battery 100, and the plurality of battery cells 20 may be connected in series, parallel or series and parallel, where the series-parallel connection means that some of the plurality of battery cells 20 are connected in series and some are connected in parallel. The plurality of battery cells 20 may be directly connected in series, parallel or series and parallel together, and then, the whole formed by the plurality of battery cells 20 is accommodated in the box body 10. Of course, the battery 100 may also be in the form of a battery module composed of a plurality of battery cells 20 in series, parallel or series and parallel first, and then, a plurality of battery modules are connected in series, parallel or series and parallel to form a whole which is accommodated in the box body 10.

The battery 100 may further include other structures. For example, the battery 100 may further include a convergence component, and the plurality of battery cells 20 may be connected through the convergence component so as to achieve electrical connection between the plurality of battery cells 20.

It should be noted that in some embodiments, the battery 100 may not be provided with a box body 10. The battery 100 includes a plurality of battery cells 20, and the battery 100 composed of the plurality of battery cells 20 may be directly assembled on an electrical apparatus to provide electric energy to the electrical apparatus through the plurality of battery cells 20. In other words, the box body 10 may be used as a part of the electrical apparatus. The electrical apparatus is, for example, a vehicle 1000, and the box body 10 may be used as a part of a chassis structure of the vehicle 1000. For example, a part of the box body 10 may become at least a part of a floor of the vehicle 1000, or a part of the box body 10 may become at least a part of a cross beam and a longitudinal beam of the vehicle 1000.

According to some embodiments of the present application, the present application further provides an electrical apparatus, the electrical apparatus includes a battery cell 20 according to any one of the above solutions, and the battery cell 20 is configured to provide electric energy to the electrical apparatus.

The electrical apparatus may be any one of the above devices or systems applying the battery cell 20.

According to some embodiments of the present application, referring to FIG. 5 to FIG. 7, the present application provides an electrode assembly 22. The electrode assembly 22 includes a main body part 221, a first tab 222 and a second tab 223. The polarities of the first tab 222 and the second tab 223 are opposite. Along the axial direction X of the main body part, the first tab 222 and the second tab 223 are arranged at the same end of the main body part 221. Along the axial direction X of the main body part, the first tab 222 has a first surface 2221 away from the main body part 221, and the second tab 223 has a second surface 2231 away from the main body part 221, the area of the first surface 2221 being larger than the area of the second surface 2231. The electrical conductivity of the first tab 222 is $X_1$, and the electrical conductivity of the second tab 223 is $X_2$, satisfying $X_2 > X_1$. The area of the first surface 2221 is $S_1$, and the area of the second surface 2231 is $S_2$, satisfying $S_1/S_2 \geq X_2/X_1$. The first surface 2221 is in a sector ring shape. Along the circumferential direction Y of the main body part, two ends of the first tab 222 respectively form a first end face 2222 and a second end face 2223, the first end face 2222 and the second end face 2223 are both parallel to the axial direction X of the main body part, and the plane where the first end face 2222 is located intersects with the plane where the second end face 2223 is located at the central axis of the main body part 221. The first end face 2222 is connected to the first surface 2221 to form a first edge 2224, the second end face 2223 is connected to the first surface 2221 to form a second edge 2225, and the angle between the first edge 2224 and the second edge 2225 is α, satisfying 90°≤α≤180°. The second surface 2231 is in a sector ring shape. Along the circumferential direction Y of the main body part, two ends of the second tab 223 respectively form a third end face 2232 and a fourth end face 2233, the third end face 2232 and the fourth end face 2233 are both parallel to the axial direction X of the main body part, and the plane where the third end face 2232 is located intersects with the plane where the fourth end face 2233 is located at the central axis of the main body part 221. The third end face 2232 is connected to the second surface 2231 to form a third edge 2234, the fourth end face 2233 is connected to the second surface 2231 to form a fourth edge 2235, and the angle between the third edge 2234 and the fourth edge 2235 is β, satisfying 90°≤β≤120°. Along the radial direction of the main body part 221, the first tab 222 and the outer peripheral surface of the main body part 221 are arranged at an interval, and the second tab 223 and the outer peripheral surface of the main body part 221 are arranged at an interval. The electrode assembly 22 is a wound electrode assembly 22, the main body part 221 has a central through hole 2211, and the central through hole 2211 passes through the main body part 221 along the axial direction X of the main body part. Along the radial direction of the main body part 221, the first tab 222 and the hole wall face of the central through hole 2211 are arranged at an interval, and the second tab 223 and the hole wall face of the central through hole 2211 are arranged at an interval.

It should be noted that in the case of no conflict, the embodiments in the present application and the features in the embodiments may be combined with each other.

The above descriptions are merely preferred embodiments of the present application and are not intended to limit the present application. For those skilled in the art, the present application may have various modifications and changes. Any modification, equivalent replacement, improvement, etc. made within the spirit and principle of the present application shall fall within the scope of protection of the present application.

What is claimed is:

1. An electrode assembly, comprising:
a cylindrical main body part; and
a first tab and a second tab, wherein polarities of the first tab and the second tab are opposite, the first tab and the second tab are arranged at the same end of the main body part along an axial direction of the main body part, the electrical conductivity of the first tab is $X_1$, and the electrical conductivity of the second tab is $X_2$, $X_2 > X_1$,
wherein along the axial direction of the main body part, the first tab has a first surface away from the main body part, and the second tab has a second surface away from the main body part, an area of the first surface being larger than an area of the second surface,
wherein along a circumferential direction of the main body part, two ends of the first tab respectively form a first end face and a second end face, the first end face and the second end face are arranged opposite to each other, the first end face is connected to the first surface to form a first edge, the second end face is connected to the first surface to form a second edge, and the first edge is parallel to the second edge.

2. The electrode assembly according to claim 1, wherein the area of the first surface is $S_1$, and the area of the second surface is $S_2$, satisfying $S_1/S_2 \geq X_2/X_1$.

3. The electrode assembly according to claim 1, wherein the first surface is in a sector ring or sector shape.

4. The electrode assembly according to claim 3, wherein along a circumferential direction of the main body part, the first end face is connected to the first surface to form a first edge, the second end face is connected to the first surface to form a second edge, and an angle between the first edge and the second edge is α, satisfying 45°≤α≤270°.

5. The electrode assembly according to claim 4, wherein the first end face and the second end face are both parallel to the axial direction of the main body part.

6. The electrode assembly according to claim 5, wherein a plane where the first end face is located intersects with a plane where the second end face is located at a central axis of the main body part.

7. The electrode assembly according to claim 1, wherein the first end face and the second end face are both parallel to the axial direction of the main body part.

8. The electrode assembly according to claim 1, wherein the second surface is in a sector ring or sector shape.

9. The electrode assembly according to claim 8, wherein along a circumferential direction of the main body part, two ends of the second tab respectively form a third end face and a fourth end face, the third end face is connected to the second surface to form a third edge, the fourth end face is connected to the second surface to form a fourth edge, and the angle between the third edge and the fourth edge is $\beta$, satisfying $45° \leq \beta \leq 270°$, wherein the third end face and the fourth end face are both parallel to the axial direction of the main body part, wherein a plane where the third end face is located intersects with a plane where the fourth end face is located at a central axis of the main body part.

10. An electrode assembly, comprising:
a cylindrical main body part; and
a first tab and a second tab, wherein polarities of the first tab and the second tab are opposite, the first tab and the second tab are arranged at the same end of the main body part along an axial direction of the main body part, the electrical conductivity of the first tab is $X_1$, and the electrical conductivity of the second tab is $X_2$, $X_2 > X_1$,
wherein along the axial direction of the main body part, the first tab has a first surface away from the main body part, and the second tab has a second surface away from the main body part, an area of the first surface being larger than an area of the second surface,
wherein along the circumferential direction of the main body part, two ends of the second tab respectively form a third end face and a fourth end face, the third end face and the fourth end face are arranged opposite to each other, the third end face is connected to the second surface to form a third edge, the fourth end face is connected to the second surface to form a fourth edge, and the third edge is parallel to the fourth edge, wherein the third end face and the fourth end face are both parallel to the axial direction of the main body part.

11. The electrode assembly according to claim 1, wherein along a radial direction of the main body part, the first tab and an outer peripheral surface of the main body part are arranged at an interval; and/or,
along the radial direction of the main body part, the second tab and the outer peripheral surface of the main body part are arranged at an interval.

12. The electrode assembly according to claim 1, wherein the electrode assembly is a wound electrode assembly, the main body part has a central through hole, and the central through hole passes through the main body part along the axial direction of the main body part,
wherein along a radial direction of the main body part, the first tab and a hole wall face of the central through hole are arranged at an interval; and/or,
along the radial direction of the main body part, the second tab and the hole wall face of the central through hole are arranged at an interval.

13. A battery cell, comprising:
a shell comprising a case, wherein an accommodating cavity having an opening is formed inside the case and configured to accommodate an electrode assembly, the case comprises a wall portion, the wall portion is an end cover closing the opening;
an electrode terminal mounted on the wall portion in an insulated manner; and
an electrode assembly accommodated in the shell, wherein the electrode assembly comprises:
a cylindrical main body part; and
a first tab and a second tab, wherein polarities of the first tab and the second tab are opposite, the first tab and the second tab are arranged at the same end of the main body part along an axial direction of the main body part, the electrical conductivity of the first tab is $X_1$, and the electrical conductivity of the second tab is $X_2$, $X_2 > X_1$,
wherein along the axial direction of the main body part, the first tab has a first surface away from the main body part, and the second tab has a second surface away from the main body part, an area of the first surface being larger than an area of the second surface,
wherein along an axial direction of the main body part, the first tab and the second tab are both arranged at one end of the main body part facing the wall portion, the first surface is configured to be electrically connected to the wall portion, and the second surface is configured to be electrically connected to the electrode terminal.

14. The battery cell according to claim 13, wherein the electrode terminal protrudes from a side of the wall portion facing the electrode assembly,
wherein along the axial direction of the main body part, the first surface is closer to the wall portion than the second surface.

15. The battery cell according to claim 13, wherein the battery cell further comprises:
a first current collecting member arranged between the wall portion and the first surface, the first current collecting member connecting the wall portion and the first surface to electrically connect the first tab and the wall portion; and
a second current collecting member arranged between the electrode terminal and the second surface, the second current collecting member and the first current collecting member being arranged at an interval, and the second current collecting member connecting the electrode terminal and the second surface to electrically connect the second tab and the electrode terminal, wherein the battery cell further comprises:
a first insulating member arranged between the electrode assembly and the wall portion, the first insulating member isolating the first current collecting member from the second current collecting member in an insulated manner, wherein the first insulating member is provided with a first mounting hole and a second mounting hole arranged at an interval, the first current collecting member is arranged in the first mounting hole, and the second current collecting member is arranged in the second mounting hole, wherein the first insulating member comprises:
a first insulator having a ring structure; and
a second insulator connected to the first insulator, the second insulator being configured to separate the internal space of the first insulator into the first mounting hole and the second mounting hole, and the second insulator being located between the first current collecting member and the second current collecting member.

16. The battery cell according to claim 13, wherein the case comprises a side wall and a bottom wall, the side wall enclosing the periphery of the bottom wall, along the axial direction of the main body part, one end of the side wall being connected to the bottom wall and the other end being enclosed to form an opening, and the side wall and the bottom wall together defining an accommodating cavity for accommodating the electrode assembly;

wherein the bottom wall is the wall portion.

17. A battery, comprising the battery cell according to claim 13.

18. An electrical apparatus, comprising the battery cell according to 13, wherein the battery cell is configured to provide electric energy.

* * * * *